United States Patent
Bae et al.

(10) Patent No.: US 12,151,363 B2
(45) Date of Patent: Nov. 26, 2024

(54) OBJECT CONTROL METHOD AND OBJECT CONTROL DEVICE

(71) Applicant: KOREA ADVANCED INSTITUTE OF SCIENCE AND TECHNOLOGY, Daejeon (KR)

(72) Inventors: Seok Hyung Bae, Daejeon (KR); Yong Kwan Kim, Gyeonggi-do (KR); Joon Hyub Lee, Seoul (KR); Sang Gyun An, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 1005 days.

(21) Appl. No.: 16/961,894

(22) PCT Filed: Jan. 21, 2019

(86) PCT No.: PCT/KR2019/000817
§ 371 (c)(1),
(2) Date: Jul. 13, 2020

(87) PCT Pub. No.: WO2019/143204
PCT Pub. Date: Jul. 25, 2019

(65) Prior Publication Data
US 2020/0384654 A1    Dec. 10, 2020

(30) Foreign Application Priority Data

Jan. 19, 2018 (KR) ................ 10-2018-0007069
Jan. 18, 2019 (KR) ................ 10-2019-0006921

(51) Int. Cl.
*B25J 13/08* (2006.01)
*B25J 13/02* (2006.01)
(Continued)

(52) U.S. Cl.
CPC ............. *B25J 13/088* (2013.01); *B25J 13/02* (2013.01); *B25J 13/06* (2013.01); *G06F 3/017* (2013.01)

(58) Field of Classification Search
None
See application file for complete search history.

(56) References Cited

U.S. PATENT DOCUMENTS 10,660,717 B2 * 5/2020 Sartor ...................... B25J 13/02
2011/0118752 A1 * 5/2011 Itkowitz ................ A61B 34/30
345/157

(Continued)

FOREIGN PATENT DOCUMENTS

CN       104423548 A    3/2015
CN       105722650 A    6/2016
(Continued)

OTHER PUBLICATIONS

International Search Report mailed Apr. 26, 2019 in PCT Application No. PCT/KR2019/000817, including English Translation, 7 pages.

*Primary Examiner* — Jaime Figueroa
*Assistant Examiner* — Arslan Azhar
(74) *Attorney, Agent, or Firm* — Dorsey & Whitney LLP

(57) ABSTRACT

An object control method and an object control device are disclosed. The disclosed object control method: detects a control activation/deactivation command generated by a user; detects, in a state in which the control activation/deactivation command is detected, a user command including a movement variation command and a rotation variation command; determines a user input by the movement variation command and the rotation variation command; and controls an object according to the user input.

13 Claims, 38 Drawing Sheets

(51) Int. Cl.
*B25J 13/06* (2006.01)
*G06F 3/01* (2006.01)

(56) References Cited

U.S. PATENT DOCUMENTS

| | | | |
|---|---|---|---|
| 2013/0096575 A1* | 4/2013 | Olson | G06F 3/014 |
| | | | 606/130 |
| 2014/0282274 A1 | 9/2014 | Everitt et al. | |
| 2015/0031455 A1 | 1/2015 | Ikeda | |
| 2015/0251316 A1* | 9/2015 | Smith | B25J 9/1625 |
| | | | 901/46 |
| 2021/0145526 A1* | 5/2021 | Robinson | A61B 34/35 |
| 2021/0145532 A1* | 5/2021 | Tucker | A61B 34/74 |

FOREIGN PATENT DOCUMENTS

| | | |
|---|---|---|
| CN | 107160393 A | 9/2017 |
| KR | 20020025198 A | 4/2002 |
| KR | 20100106203 A | 10/2010 |
| KR | 20130022996 A | 3/2013 |
| KR | 101717375 B1 | 3/2017 |

\* cited by examiner

OBJECT CONTROL METHOD AND OBJECT CONTROL DEVICE

TECHNICAL FIELD

The following description relates to an object control method and device and, more particularly, to a method and device for controlling an object by determining a user input from one or two controllers or by determining a user input from one or two hands.

BACKGROUND ART

Industrial robots have been used as indispensable production tools in modern industrial sites because they can perform repetitive tasks faster and more precisely than human workers. Among the industrial robots, a collaborative robot is emerging as a key element in the concept of smart production in the future 4th industry where organic collaboration between human workers and robots is emphasized. It is expected that productivity will be maximized in various industrial sites where robots could not be applied, by adding the efficiency and precision of robots to the judgment of human workers who can flexibly cope with various situations.

There are two techniques for controlling a collaborative robot. The first technique allows a worker to instruct/record a motion by applying force to a body of the collaborative robot. However, this technique is vulnerable to various changes in the installation environment since a considerable external force of the worker is required to move the robot, and the worker needs to be able to approach and touch the robot in all directions.

The second technique allows a worker to instruct/record a robot motion by pressing a button of a separately connected terminal. However, in this technique, since a moving direction is defined on the absolute coordinate system fixed relative to the robot, the worker is likely to be confused about the moving direction of the robot according to his/her position/direction. Further, since only one moving direction/axis may be controlled at a time, even a simple operation is performed through excessively repetitive manipulations, the operation performance and safety are deteriorated.

There is a demand for an object control technique to solve such issues.

DISCLOSURE OF INVENTION

Technical Goals

The present disclosure may allow a user to control an object as seen from his or her position at any location. It is possible to promptly check and manipulate/handle a motion of an object to be manipulated while maintaining a gaze to the object.

The present disclosure may perform a complex motion at once, thereby reducing a working time when compared to an existing method. Since the manipulation manner is the same as that of moving a real object (a bar, a plate), even a non-expert user may learn and use in a short time.

The present disclosure may instantly and dynamically adjust the precision and speed of manipulation by utilizing a support member including a length-variable member and a length-fixed member.

The present disclosure may enable a manipulation in a wider range of motion by overcoming limited ranges of motion of a wrist and an arm joint of a human body using one or two hands, and enable a more stable control by utilizing the support member than moving hands in the air.

Technical Solutions

According to an aspect, there is provided an object control method including detecting a control activation/deactivation command generated by a user, detecting a user command including a translation variation amount command and a rotation variation amount command, in a state in which the control activation/deactivation command is detected, determining a user input according to the translation variation amount command and the rotation variation amount command, and controlling an object according to the user input.

The detecting of the user command may include detecting the user command generated by any one of a one-handed gesture and a two-handed gesture of the user.

The detecting of the control activation/deactivation command may include detecting the control activation/deactivation command through whether a pre-agreed specific-shaped hand gesture is detected.

The pre-agreed specific-shaped hand gesture may be any one of a gesture of contacting at least two fingers of the user each other and a fist gesture of the user.

The determining of the user input may include setting a virtual reference geometry based on a gesture generated by one or two hands of the user, and determining a translation amount and a rotation amount of the object according to a translation variation amount and a rotation variation amount of the set reference geometry.

The virtual reference geometry may be a plane fixed to a contact point of two contacting fingers, among fingers of one hand of the user.

The virtual reference geometry may be a plane fixed to a contact point of contacting fingers of each hand, among fingers of the two hands of the user.

The virtual reference geometry may be a bar that is formed firstly based on one hand of the user, and formed secondly by being projected on a plane perpendicular to an axis of the object.

The virtual reference geometry may be a bar that is formed firstly based on a contact point of contacting fingers of each hand, among fingers of the two hands of the user, and formed secondly by being projected on a plane perpendicular to an axis of the object.

The determining of the user input may include determining a corresponding ratio based on a distance between the two hands of the user, and reflecting, in the user input, the translation variation amount and the rotation variation amount according to the corresponding ratio.

The corresponding ratio may be determined to be great when the distance between the two hands of the user is short.

The detecting of the user command may include detecting the user command generated by one or two controllers that are gripped by the user with one or two hands and include a signal generating switch.

The detecting of the control activation/deactivation command may include detecting the control activation/deactivation command through ON/OFF detection of a switch provided in the controllers.

The determining of the user input may include setting a virtual reference geometry based on the one or two controllers, and determining a translation amount and a rotation amount of the object according to a translation variation amount and a rotation variation amount of the set reference geometry.

The virtual reference geometry may be a plane fixed to a predetermined position of the controller gripped by the user with one hand.

The virtual reference geometry may be a plane fixed to predetermined positions of the controllers gripped by the user with two hands.

The virtual reference geometry may be a bar that is formed firstly in a length or width direction of the controller gripped by the user with one hand, and formed secondly by being projected on a plane perpendicular to an axis of the object.

The virtual reference geometry may be a bar that is formed firstly to penetrate through predetermined positions of the controllers gripped by the user with two hands, and formed secondly by being projected on a plane perpendicular to an axis of the object.

The determining of the user input may include determining a corresponding ratio based on a distance between the controllers gripped by the user with two hands, and reflecting, in the user input, the translation variation amount and the rotation variation amount according to the corresponding ratio.

The corresponding ratio may be determined to be great when the distance between the controllers is short.

The controlling of the object may include controlling an end portion or an axial portion of the object.

The controlling of the object may include controlling any one of a real object and a virtual object in virtual reality (VR) or augmented reality (AR).

According to an aspect, there is provided an object control device including a detection means configured to detect a control activation/deactivation command, a translation variation amount command, and a rotation variation amount command generated by a user, and a processor configured to recognize a user command by receiving a signal detected by the detection means and apply a control signal corresponding to the recognized user command to an object.

The object control device may further include a user command transfer means including an instrument to be gripped by the user, the user command transfer means configured to transfer the user command to the detection means.

The user command transfer means may include a controller to be gripped by the user with one hand and including a switch for generating a control activation/deactivation signal.

The object control device may further include a support member configured to fix the controller.

The support member may be any one of a length-variable member having elasticity and a length-variable member having no elasticity.

The user command transfer means may include two controllers to be gripped by the user respectively with two hands, wherein at least one of the controllers may include a switch for generating a control activation/deactivation signal.

The object control device may further include a support member configured to physically connect the two controllers.

The support member may be any one of a length-variable member having elasticity or a length-variable member having no elasticity.

Effects

According to an embodiment, by controlling an object using one or two controllers or through one or two hands, a complex task of moving or manipulating the object in a three-dimensional space may be effectively performed, whereby even users who are non-experts in robotics may easily and quickly control an object in work environments of various industries. Further, when the controllers or the hands of the user are connected to a support member, the manipulation may be stabilized, and the precision and speed may be adjusted.

According to an embodiment, through a line segment/reference plane model, the stability by utilizing a support member, and one-hand or two-hand interactions characterized in a clutching technique, the limitations in the human body structure may be overcome, and a higher precision and a wider range of motion may be guaranteed.

BEST MODE FOR CARRYING OUT THE INVENTION

Figure 1:
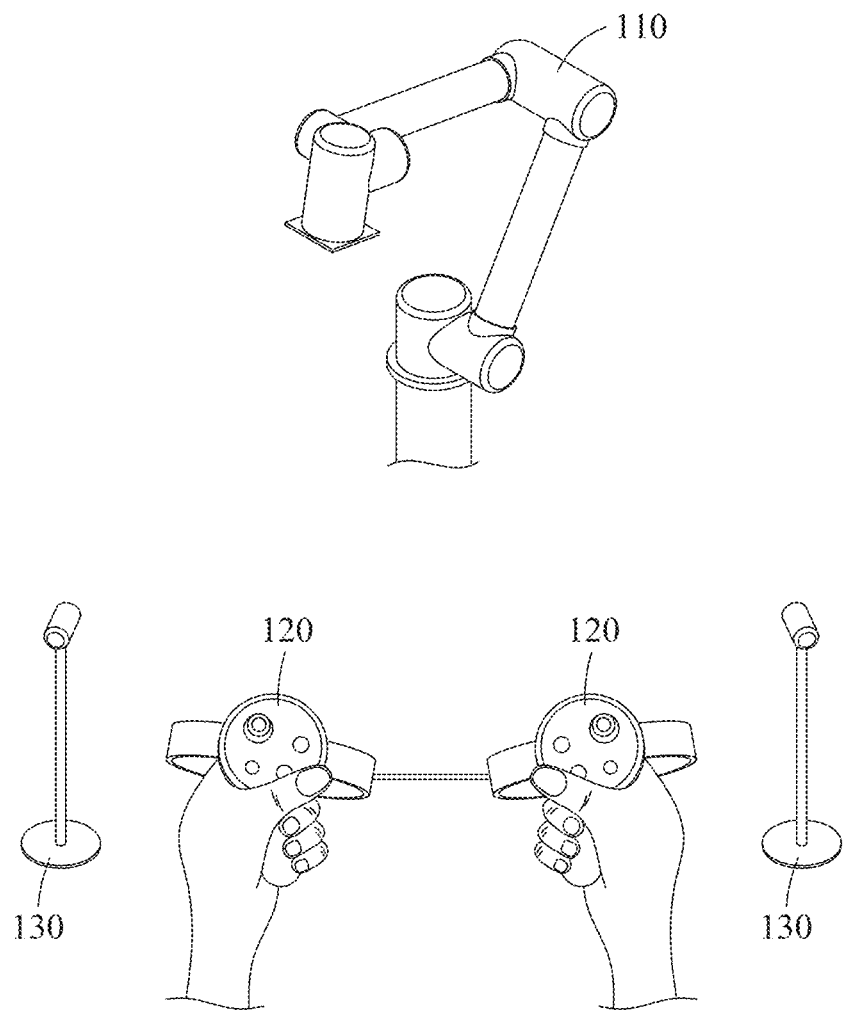
FIG. 1 illustrates an object control system according to an embodiment.

The following detailed structural or functional description is provided as an example only and various alterations and modifications may be made to the embodiments. Accordingly, the embodiments are not construed as being limited to the disclosure and should be understood to include all changes, equivalents, and replacements within the technical scope of the disclosure.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component.

As used herein, the singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined herein, all terms used herein including technical or scientific terms have the same meanings as those generally understood by one of ordinary skill in the art. Terms defined in dictionaries generally used should be construed to have meanings matching with contextual meanings in the related art and are not to be construed as an ideal or excessively formal meaning unless otherwise defined herein.

Hereinafter, the embodiments will be described in detail with reference to the accompanying drawings. The following specific structural or functional descriptions are exemplary to merely describe the embodiments, and the scope of the embodiments is not limited to the descriptions provided in the present specification. Various changes and modifications can be made thereto by those of ordinary skill in the art. Like reference numerals in the drawings denote like elements, and a known function or configuration will be omitted herein.

FIG. 1 illustrates an object control system according to an embodiment.

Referring to FIG. 1, an object control system includes an object 110, controllers 120, and sensors 130.

The object 110 is an object to be controlled and may include, for example, a remote object to be controlled by a user, or a virtual object included in virtual reality (VR) or augmented reality (AR).

Here, the remote object may include various real-world objects without limitation, for example, an industrial robot (for example, a collaborative robot), a drone, and a camera mounted on the drone. As shown in the example of FIG. 1, the object 110 may include at least one axial portion and an end portion. The object 110 may operate based on a rotation of the at least one axial portion and a translation/rotation of the end portion.

The virtual object may be an object included in VR or AR that the user experiences. For example, the virtual object may be an object to be controlled by the user in a virtual reality of a game.

The controllers 120 may be connected to each other through a support member. Here, the support member may include a length-variable member having elasticity, a length-variable member having no elasticity, and a length-fixed member. The length-variable member having elasticity may include a rubber band, a spring, and a device, such as a mechanical linkage or a multi-joint member, that includes a material having no elasticity but is designed to have an elastic force/restoring force using pneumatic or many mechanical devices. The length-variable member having no elasticity may include a device, such as a mechanical linkage or a multi-joint member, that is designed to have no elastic force/restoring force. The length-fixed member may include a bar, and a cable.

The controllers 120 may be gripped by the user with both hands. When the controllers 120 are connected to each other through the support member, a tensile force may be induced to both hands gripping the controllers 120, and the stabilization, the precision, and the speed of the both-handed manipulation may be adjusted through the tensile force. That is, the support member connecting the controllers 120 may enable a more stable object control than moving both hands in the air. The controllers 120 may include at least one button. When a button is selected, a predetermined user input may be transmitted to the object control system.

The sensors 130 may be devices that track three-dimensional (3D) positions of the controllers 120 gripped by the user with both hands and include, for example, vision sensors. The positions of both hands of the user may be detected through the sensors 130 in a 3D space, and a user input determined based on an interaction of both hands may be transmitted to the object control system.

In another example, the controllers 120 may not be provided separately, and the sensors 130 may track the positions of both hands of the user to determine the user input. In this example, there may be provided a support member connecting both hands of the user. Using the support member may be more stable than moving both hands in the air, and the precision and the speed may be adjusted through the support member. Further, the sensors 130 may detect a change in a hand posture of the user, for example, detect whether the user makes a clenched fist or opens his/her hand, thereby determining a user input corresponding to whether a button included in the controllers 120 is selected.

Figure 2A:
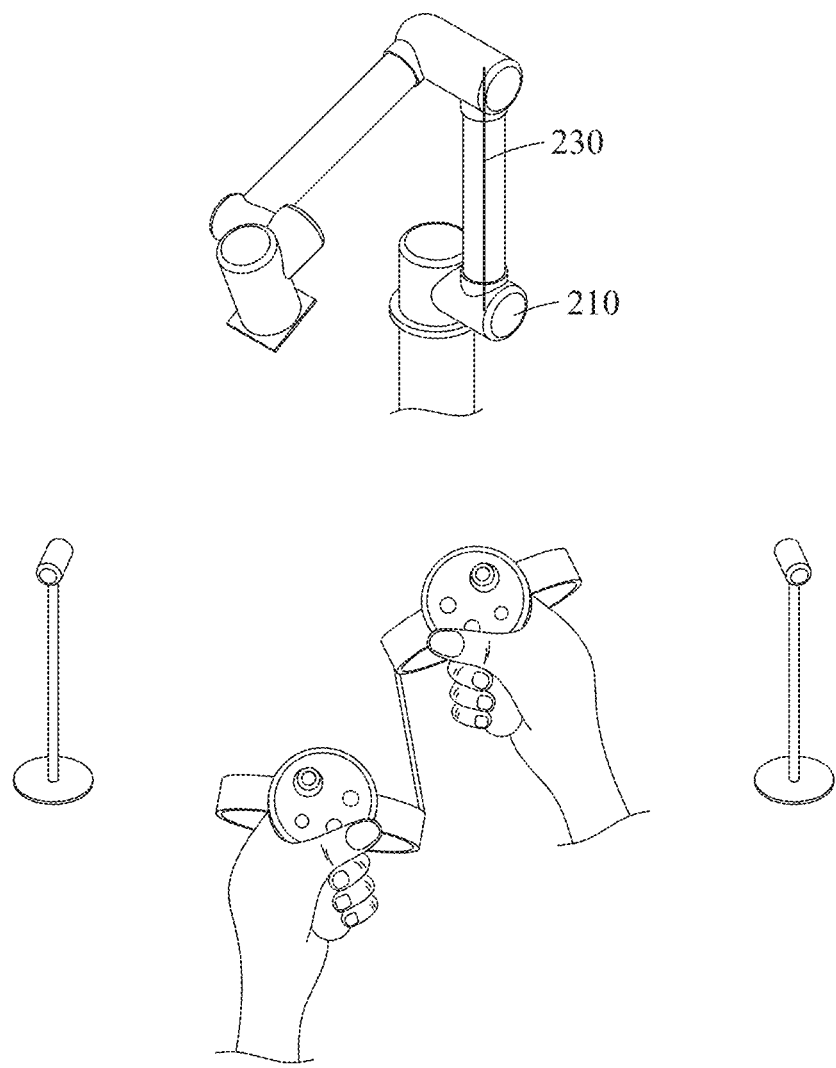
FIGS. 2A and 2B illustrate examples of controlling an object according to an embodiment.
Figure 2B:
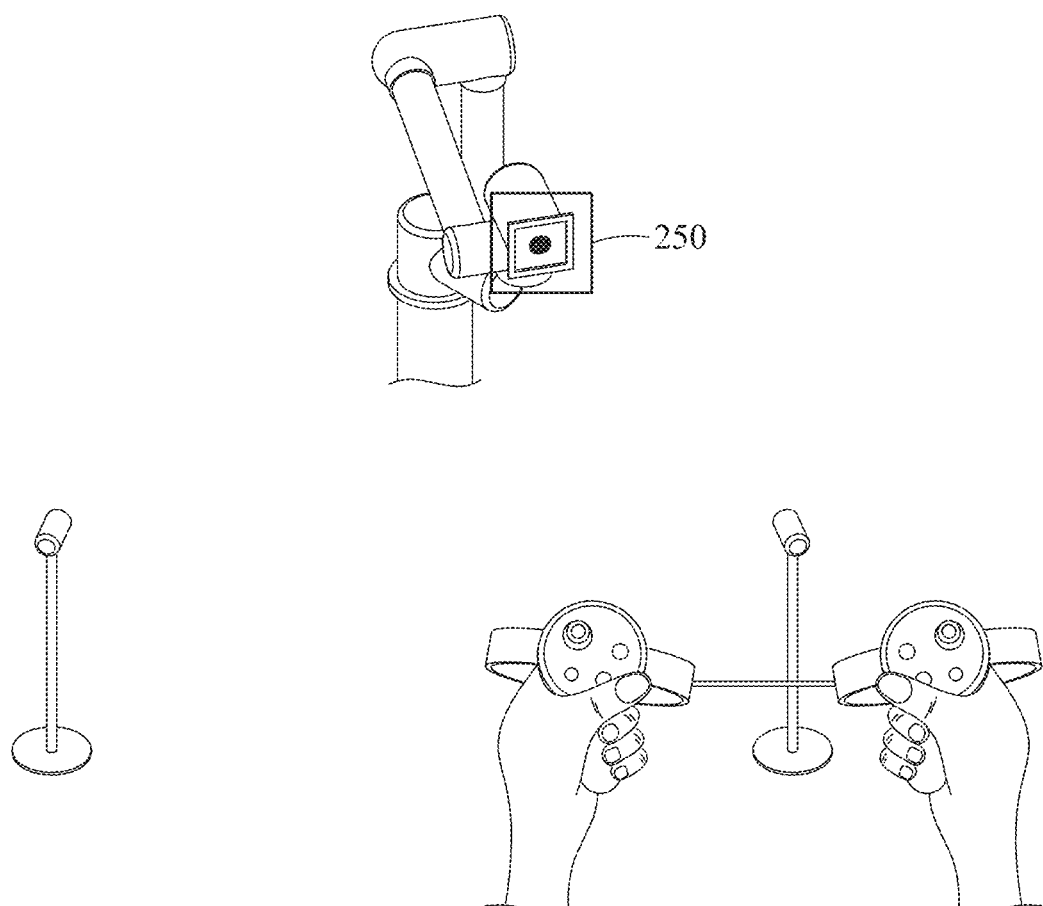

FIGS. 2A and 2B illustrate examples of controlling an object according to an embodiment.

Referring to FIG. 2A, an axial portion 210 of an object may be rotated based on a user input. When the axial portion 210 of the object is rotated, a portion 230 of the object may be rotated together about the axial portion 210.

Referring to FIG. 2B, an end portion 250 of the object may be moved based on a user input. The end portion 250 of the object may be translated, or rotated, or rotated while translated according to the user input.

Figure 3:
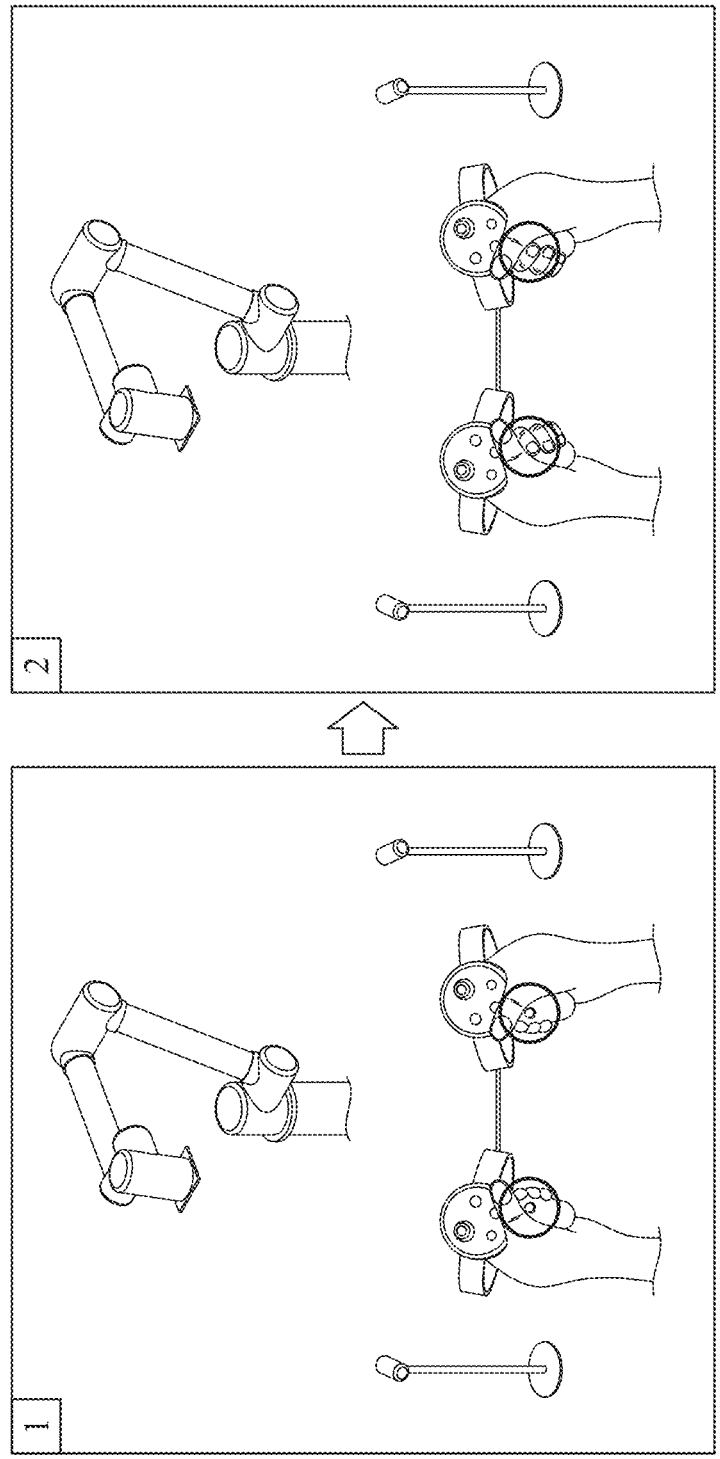
FIG. 3 illustrates a process of activating an object control according to an embodiment.

FIG. 3 illustrates a process of activating an object control according to an embodiment.

Referring to FIG. 3, a user may activate an object control by selecting a button included in controllers. For example, the object control may be activated while buttons respectively included in the controllers are pressed at the same time with both hands of the user. In this example, if any one of the buttons of the controllers is not selected or a button selection is canceled, the object control may be deactivated immediately. Through this, a malfunction of the object may be prevented, and the manipulation may be stopped promptly in case of an unexpected situation, whereby the safety of the user may be secured.

Figure 4:
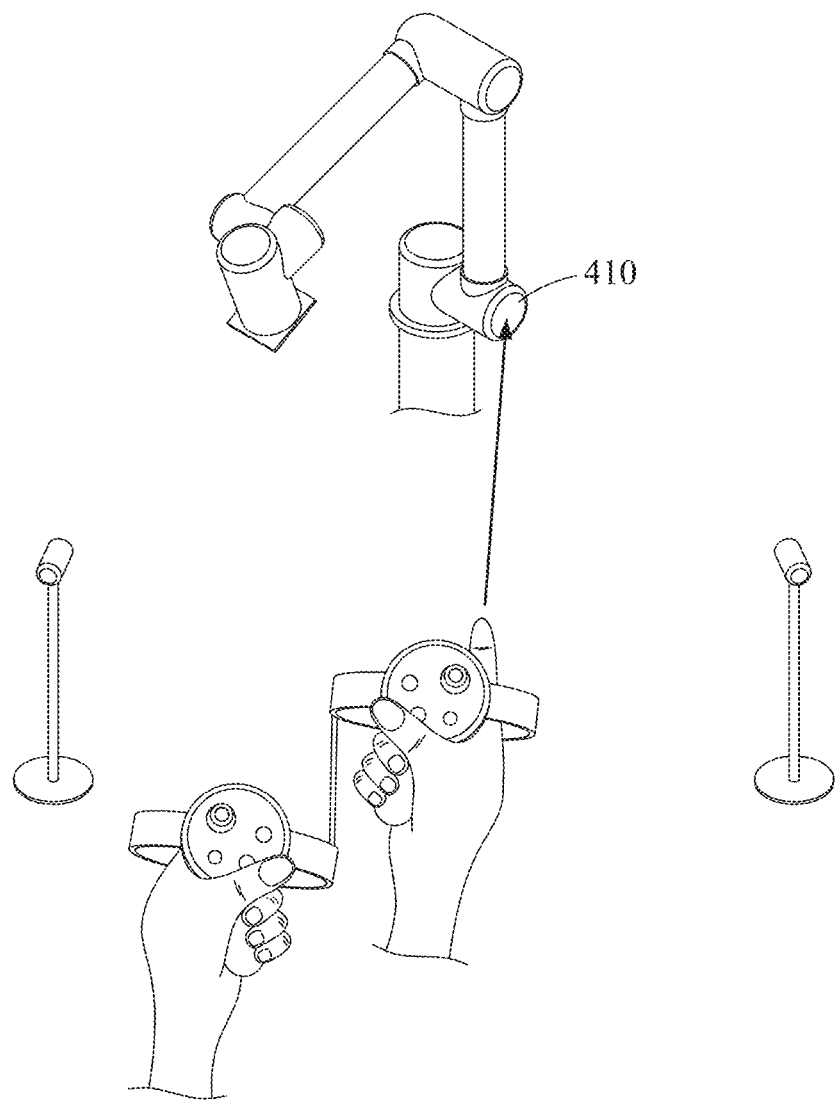
FIG. 4 illustrates a process of selecting an axis portion of an object to be controlled according to an embodiment.

FIG. 4 illustrates a process of selecting an axial portion of an object to be controlled according to an embodiment.

Referring to FIG. 4, an axial portion of an object to be controlled by a user may be selected. For example, an axial portion 410 of an object touched with a hand of the user gripping controllers or indicated with the hand of the user may be identified and selected as a portion to be controlled by the user. To specify the axial portion 410 of the object designated by the user as described above, the sensors described with reference to FIG. 1 may be used, and another sensor (for example, an image sensor included in a head-mounted display (HMD)) may be used further.

As shown in the example of FIG. 4, the user may select, with the right index finger, the axial portion 410 to be controlled from among axial portions of the object.

FIGS. 5 through 8 illustrate a process of rotating an axial portion of an object according to an embodiment.

Figure 5:
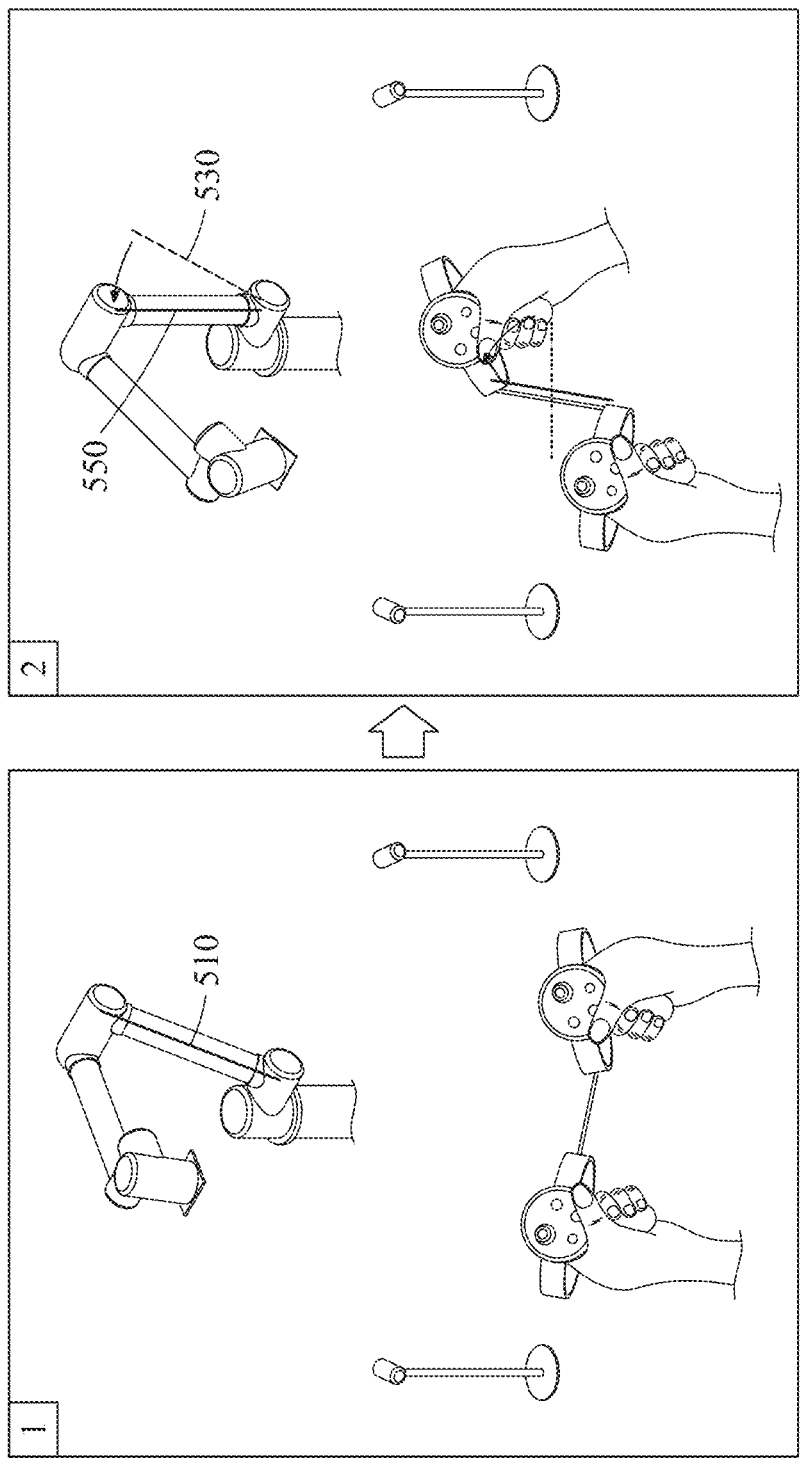
FIGS. 5 through 8 illustrate a process of rotating an axial portion of an object according to an embodiment.

Referring to FIG. 5, an axial portion of an object may be rotated based on a user input. First, a portion 510 to be rotated together as the axial portion of the object is rotated may be identified and mapped to a line segment connecting the positions of controllers. When there occurs a rotation variation amount of the line segment as the user moves the controllers, the portion 510 may be rotated according to the rotation variation amount. In this example, in the rotation variation amount of the line segment, only a component perpendicular to the axial portion of the object may be considered. This will be described in detail with reference to FIG. 6. In FIG. 5, a portion 550 rotated from the original position 530 according to the rotation variation amount is illustrated.

Figure 6:
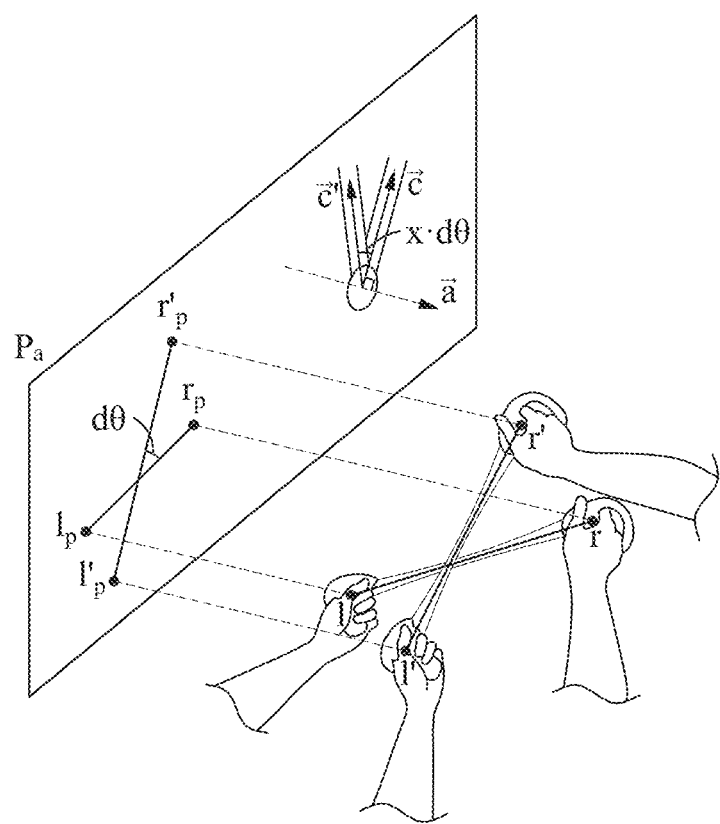

Referring to FIG. 6, a process of rotating a portion of an object based on a rotation variation amount of a line segment measured using a rotation plane is illustrated.

First, a line segment and a rotation plane may be generated to mathematically express a rotation variation amount. A line segment $\overline{lr}$ defined by the positions of the controllers gripped by a user with both hands may be generated. A rotation plane $P_a$ perpendicular to the axis portion $\vec{a}$ of the object to be controlled may be generated. In this example, the line segment $\overline{lr}$ and the rotation plane $P_a$ may not be visually provided to the user, and since only a rotation $\vec{c}$iation amount of the line segment $\overline{lr}$ is used, the line segment $\overline{lr}$ and a rotation target may not match.

In addition, the rotation variation amount of the line segment lr may be calculated. A rotation variation amount dθ may be calculated using two line segments $\overline{l_p r_p}$ and $\overline{l'_p r'_p}$ obtained by respectively projecting, to the rotation plane $P_a$, a line segment $\overline{lr}$ before the user input and a line segment $\overline{l'r'}$ after the user input.

Further, a rotation amount X*dθ of the axial portion may be determined by applying a predetermined corresponding ratio to the rotation variation amount dθ. In this example, the applied corresponding ratio x may be set in various manners. For example, the corresponding ratio x may be set based on a distance between the controllers, or set by the user, or adaptively determined depending on a situation in which the object is controlled. For example, a relatively small corresponding ratio x may be determined if the situation in which the object is controlled is a situation in which a precise control is required (for example, robotic surgery), and a relatively great corresponding ratio x may be determined if the situation in which a fast control, rather than the precision, is required (for example, a task of conveying goods).

The precision and the speed of the object control may be adjusted according to the distance between the controllers.

The controllers may be connected by a support member, and thus a tensile force according to the distance between the controllers may be applied to the controllers. For example, a great tensile force may be generated when the distance between the controllers is long, and the tensile force may be transmitted to both hands of the user gripping the controllers.

Figure 7A:
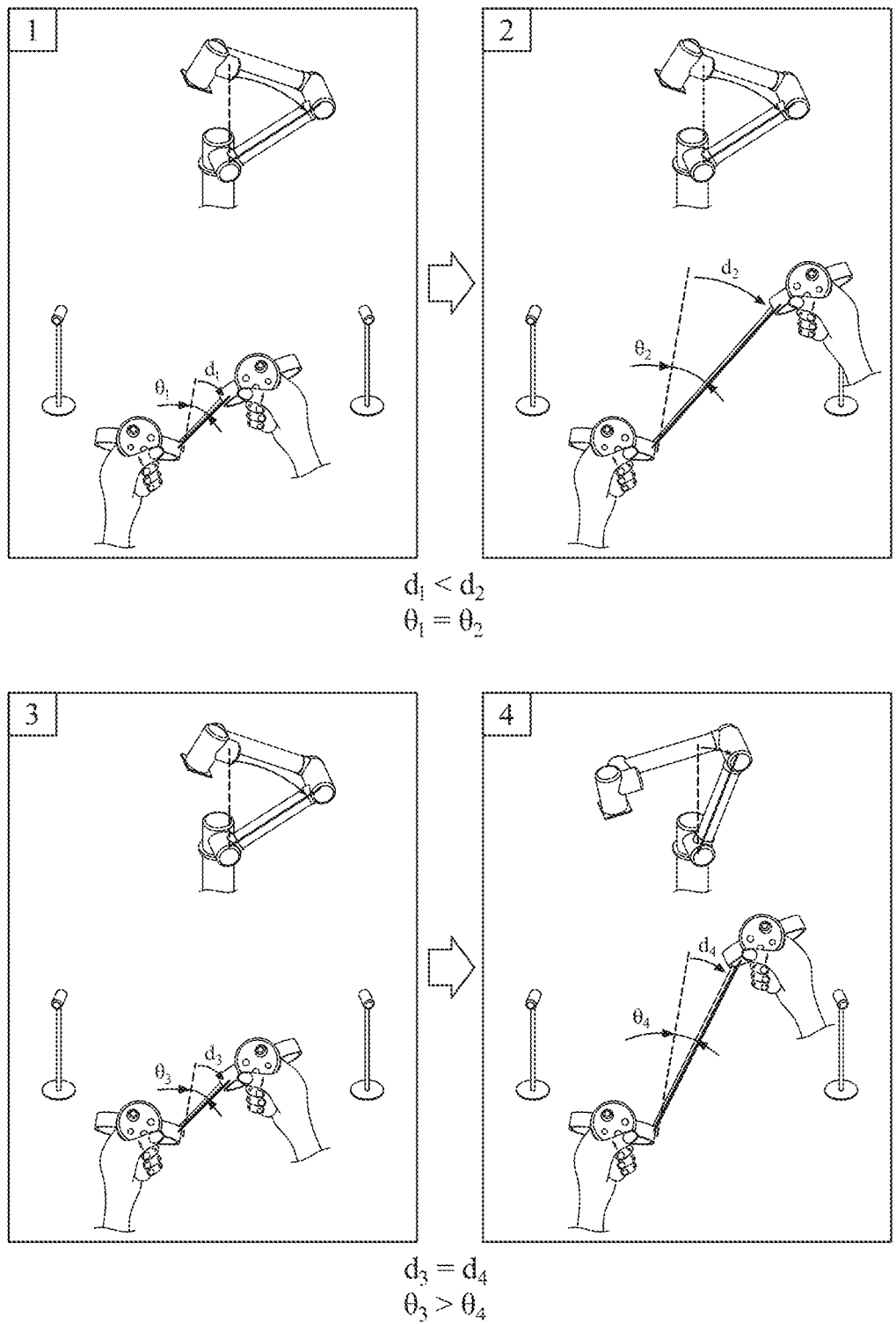

Referring to FIG. 7A, the magnitude of the tensile force induced to the controllers by the support member and a distance both hands need to move for the same rotation variation amount may vary depending on the distance between the controllers. Thus, the precision and the speed of the object controller may be adjusted by the distance between the controllers. Box "1" and Box "2" on the top of FIG. 7A illustrate an example in which the distance both hands need to move for the same rotation variation amounts $\theta_1$ and $\theta_2$ varies from $d_1$ to $d_2$ according to the distance between the controllers. In this example, the rotation amounts of the axial portion of the object may be the same. Further, Box "3" and Box "4" on the bottom of FIG. 7A illustrate an example in which the rotation variation amount for the same distances $d_3$ and $d_4$ both hands need to move varies from $\theta_3$ to $\theta_4$ according to the distance between the controllers. In this example, the rotation amounts of the axial portion of the object may be different.

For example, if the distance between the controllers is short, a weak tensile force is applied to the controllers, and both hands of the user need to move a short distance, such that the object control may be performed with decreased precision but with increased speed. Conversely, if the distance between the controllers is long, a strong tensile force is applied to the controllers, and both hands of the user need to move a long distance, such that the object control may be performed with increased precision but with decreased speed. As described above, it is possible to adaptively adjust the precision and speed of the object control using the support member connecting the controllers, depending on a situation in which an object is controlled.

Figure 7B:
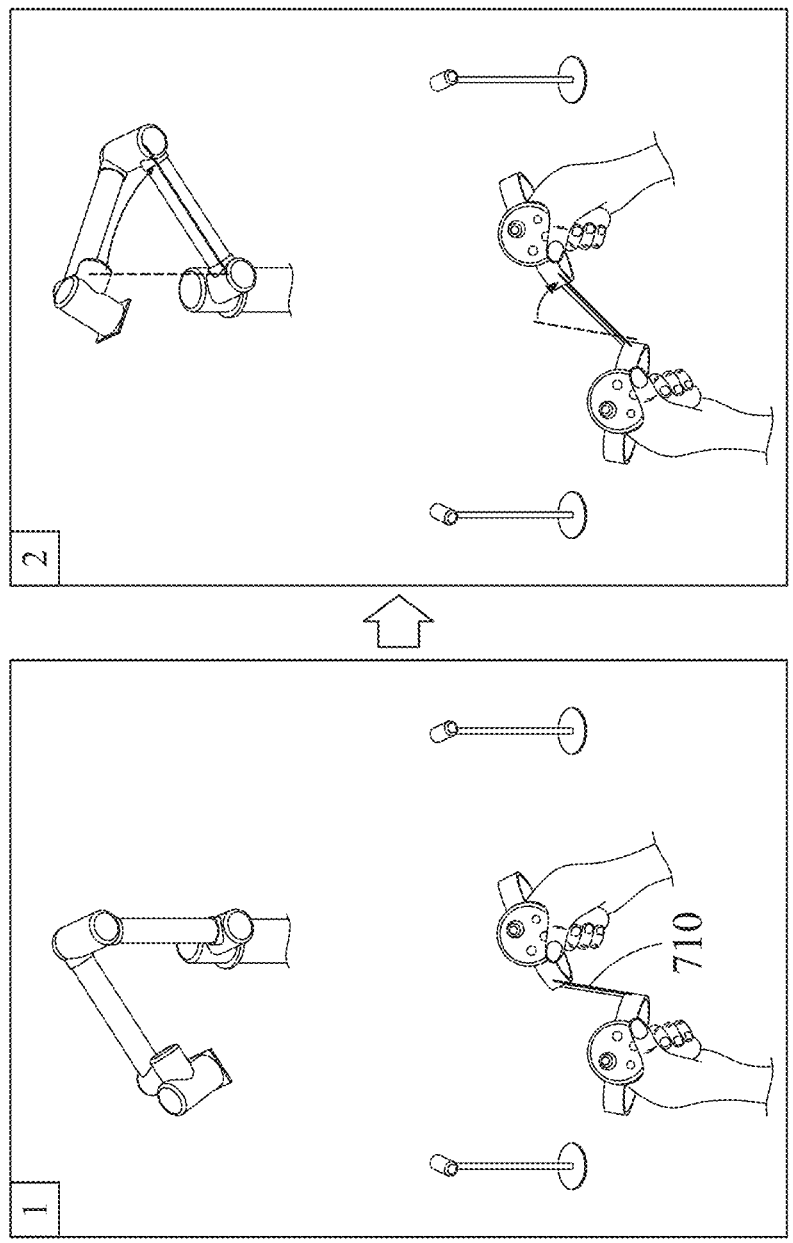
Figure 7C:
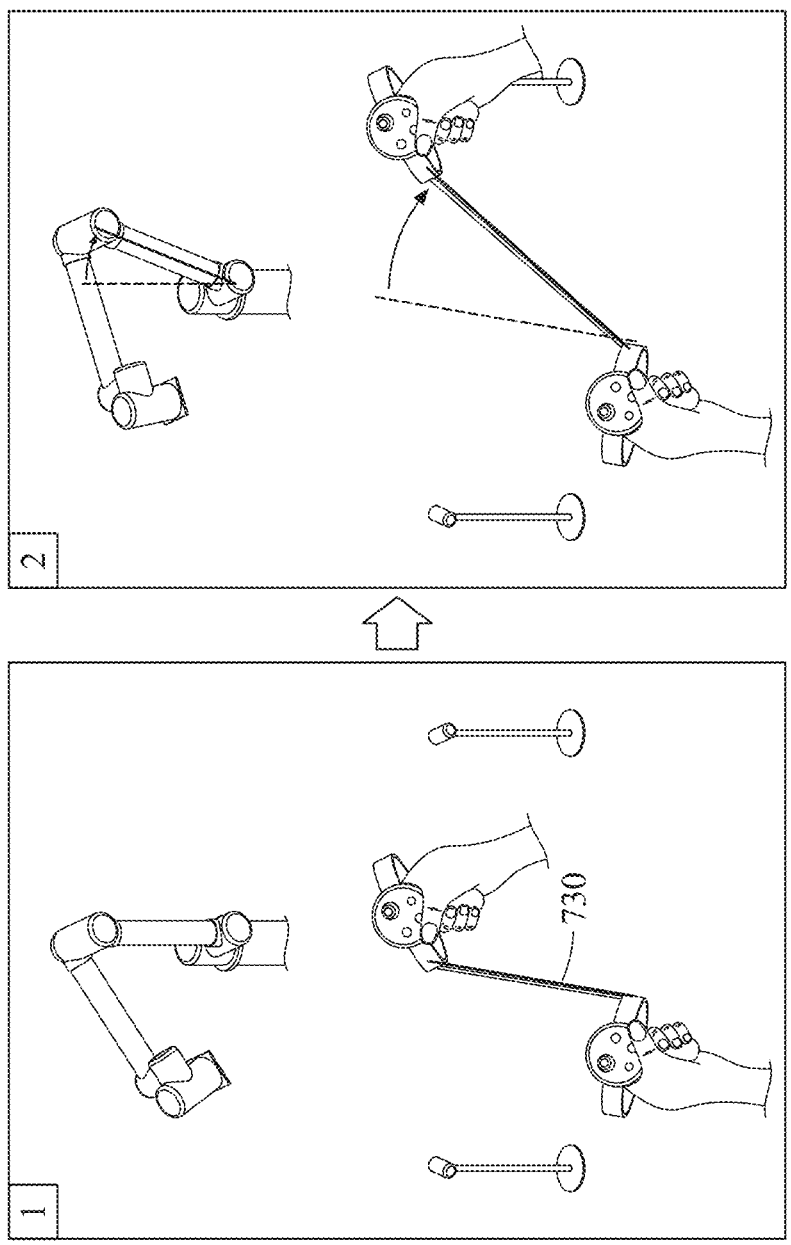

In some embodiments, the distance between the controllers may be applied to the corresponding ratio described above, examples of which are shown in FIGS. 7B and 7C. FIG. 7B illustrates an example in which controllers are at a short distance 710, and FIG. 7C illustrates an example in which controllers are at a long distance 730. As shown in FIGS. 7B and 7C, an example of controlling an object using the controllers that are at the long distance 730 may bring about a relatively small rotation amount of an axial portion of an object, when compared to an example of controlling the object using the controllers that are the short distance 710. That is, a relatively small corresponding ratio may be set for the example of controlling the object using the controllers that are at the long distance 730, when compared to the example of controlling the object using the controllers that are at the short distance 710. Thus, as the distance between the controllers is long, the rotation amount of the axial portion of the object determined according to a rotation variation amount of a line segment may be small. Conversely, as the distance between the controllers is short, the rotation amount of the axial portion of the object determined according to the rotation variation amount may be great.

Figure 8:
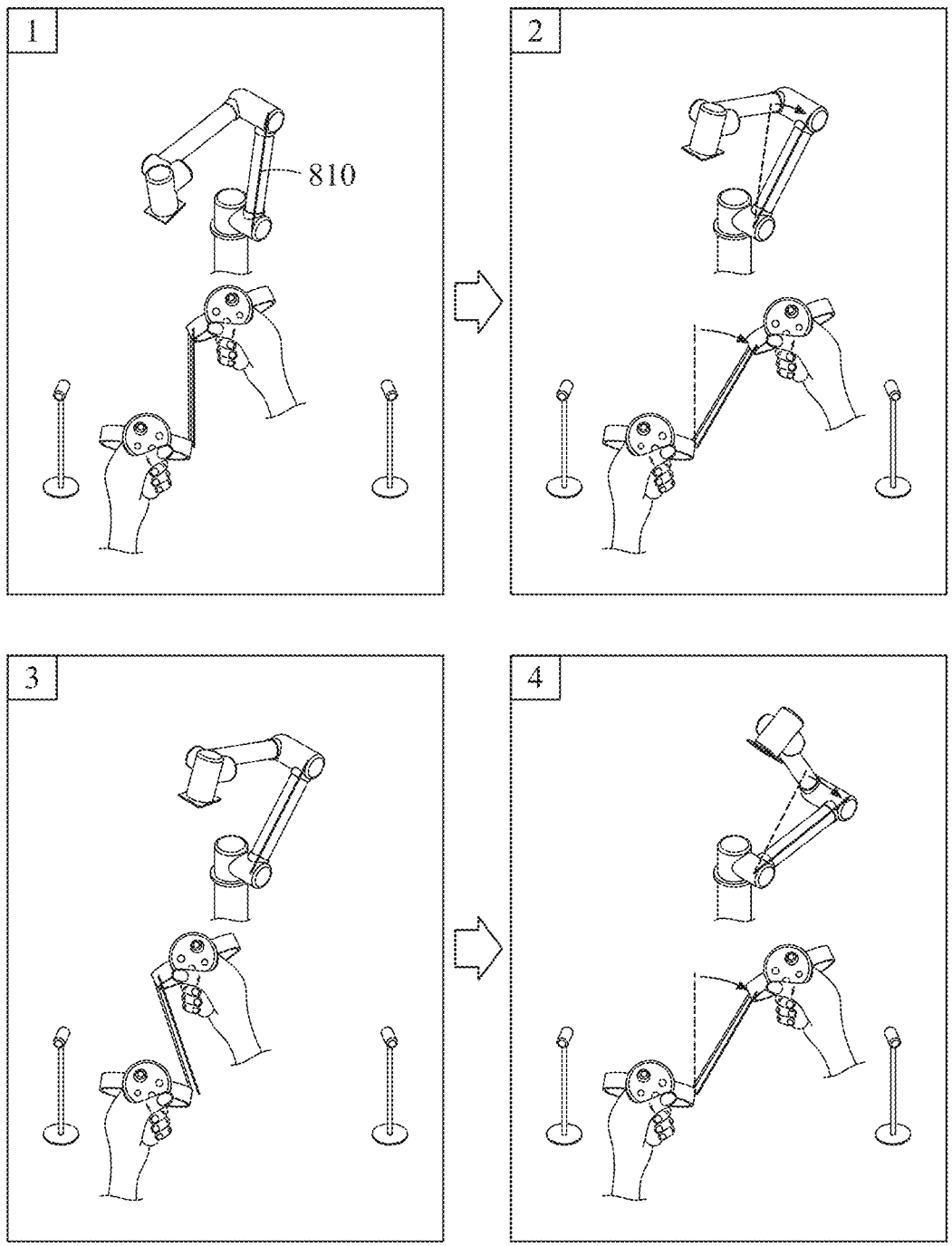

Referring to FIG. 8, a clutching operation may be applied to the control of an axial portion of an object. By overlapping repetitive motions even within the restricted ranges of motion of the controllers, the clutching operation that enables an object control in a wider range of motion may be applied.

In the example of FIG. 8, if a portion 810 of the object is to be controlled, a user may perform an object control by moving the controllers while pressing buttons included in the controllers, adjust the positions of the controllers with the hands off the buttons, and then perform the object control by moving the controllers while pressing the buttons again. In doing so, the object control not limited to the actual ranges of motion of the controllers may be performed.

Figure 9:
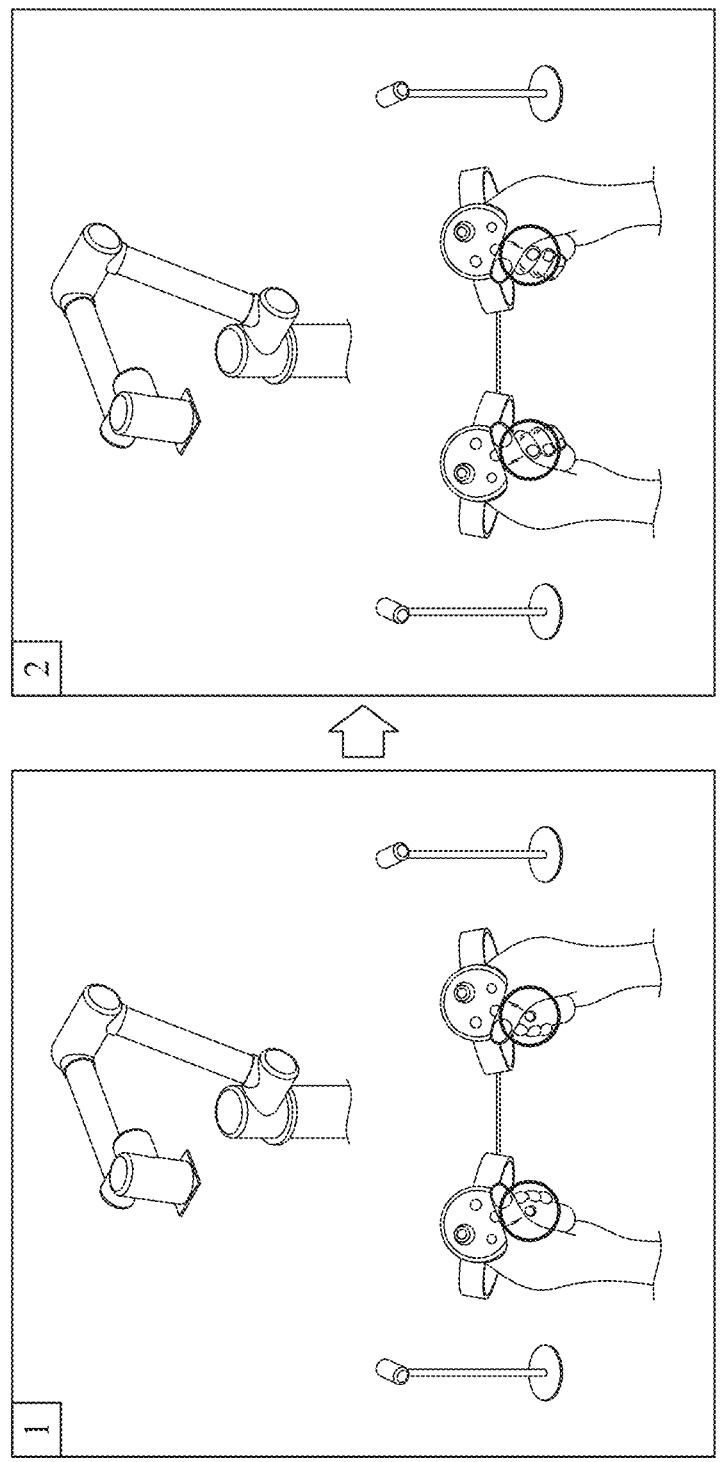
FIG. 9 illustrates a process of activating an object control according to an embodiment.

FIG. 9 illustrates a process of activating an object control according to an embodiment.

Referring to FIG. 9, a user may activate an object control by pressing a button included in controllers. For example, the object control may be activated while buttons respectively included in the controllers are pressed at the same time with both hands of the user. In this example, if any one of the buttons of the controllers is not selected or a button selection is canceled, the object control may be deactivated immediately. Through this, a malfunction of the object may be prevented, and the manipulation may be stopped promptly in case of an unexpected situation, whereby the safety of the user may be secured.

Figure 10:
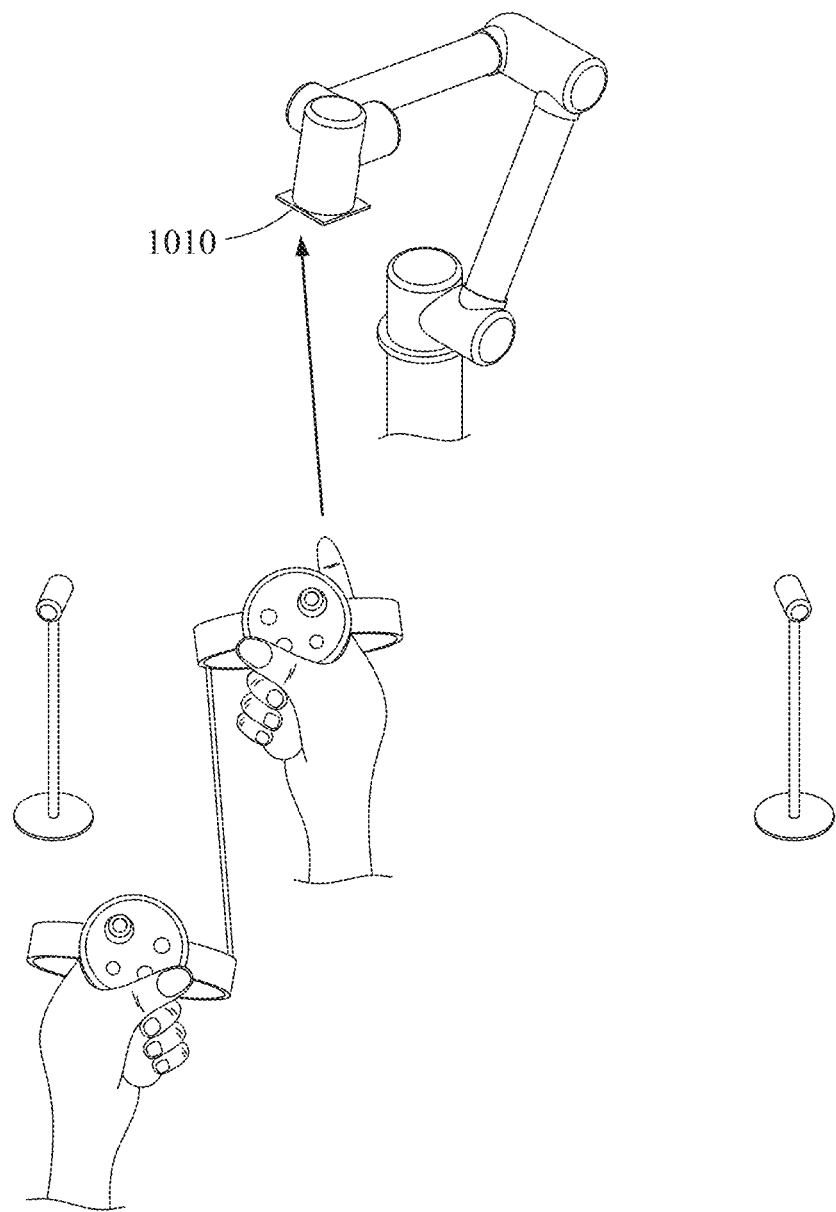
FIG. 10 illustrates a process of selecting an end portion of an object to be controlled according to an embodiment.

FIG. 10 illustrates a process of selecting an end portion of an object to be controlled according to an embodiment.

Referring to FIG. 10, an end portion of an object to be controlled by a user may be selected. For example, an end portion 1010 of an object touched with a hand of the user gripping controllers or indicated with the hand of the user may be identified and selected as a portion to be controlled by the user. To specify the end portion 1010 of the object designated by the user as described above, the sensors described with reference to FIG. 1 may be used, and another sensor (for example, an image sensor included in an HMD) may be used further. In the example of FIG. 10, the user may select, with the right index finger, the end portion 1010 to be controlled from among axial portions of the object.

Figure 11:
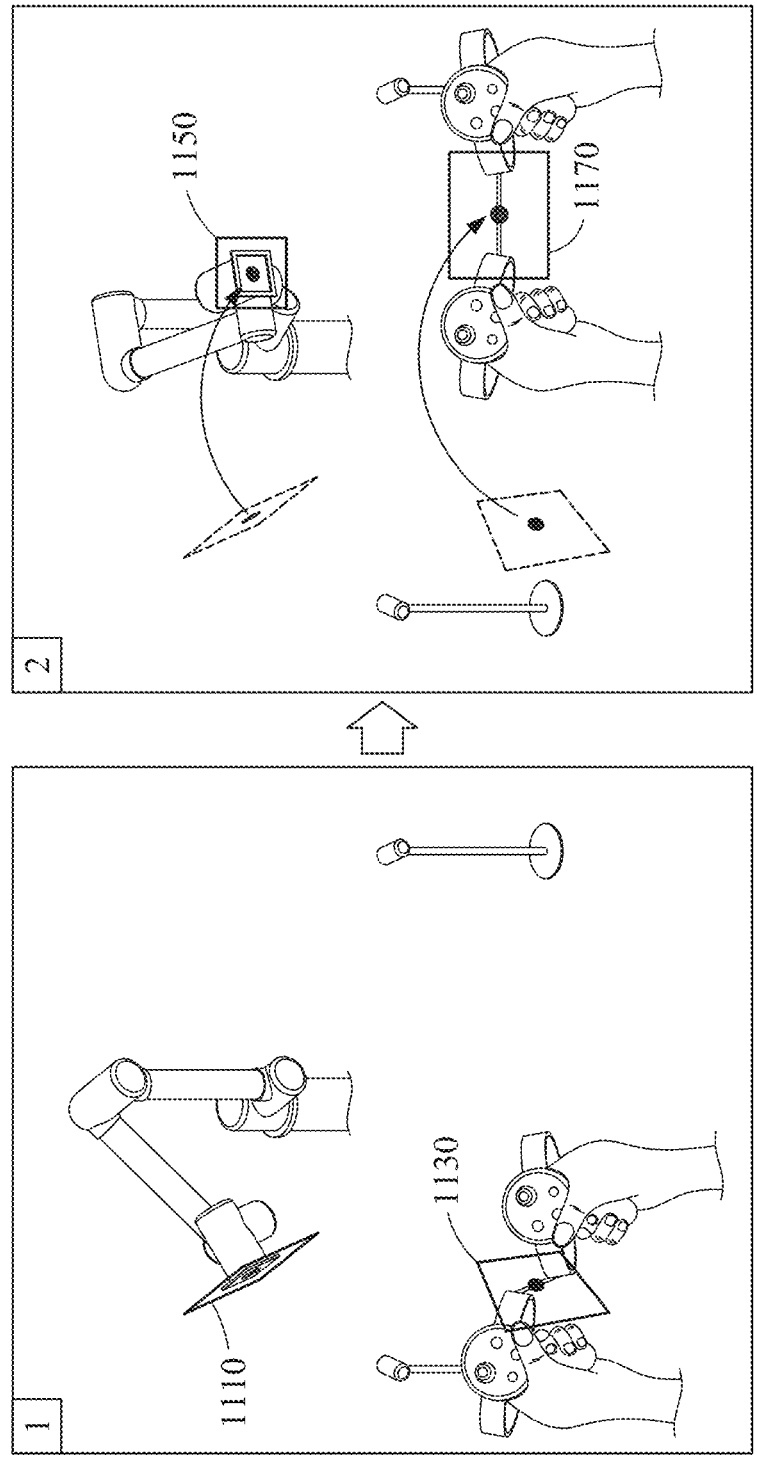
FIGS. 11 through 13 illustrate a process of controlling a motion of an end portion of an object according to an embodiment.
Figure 12A:
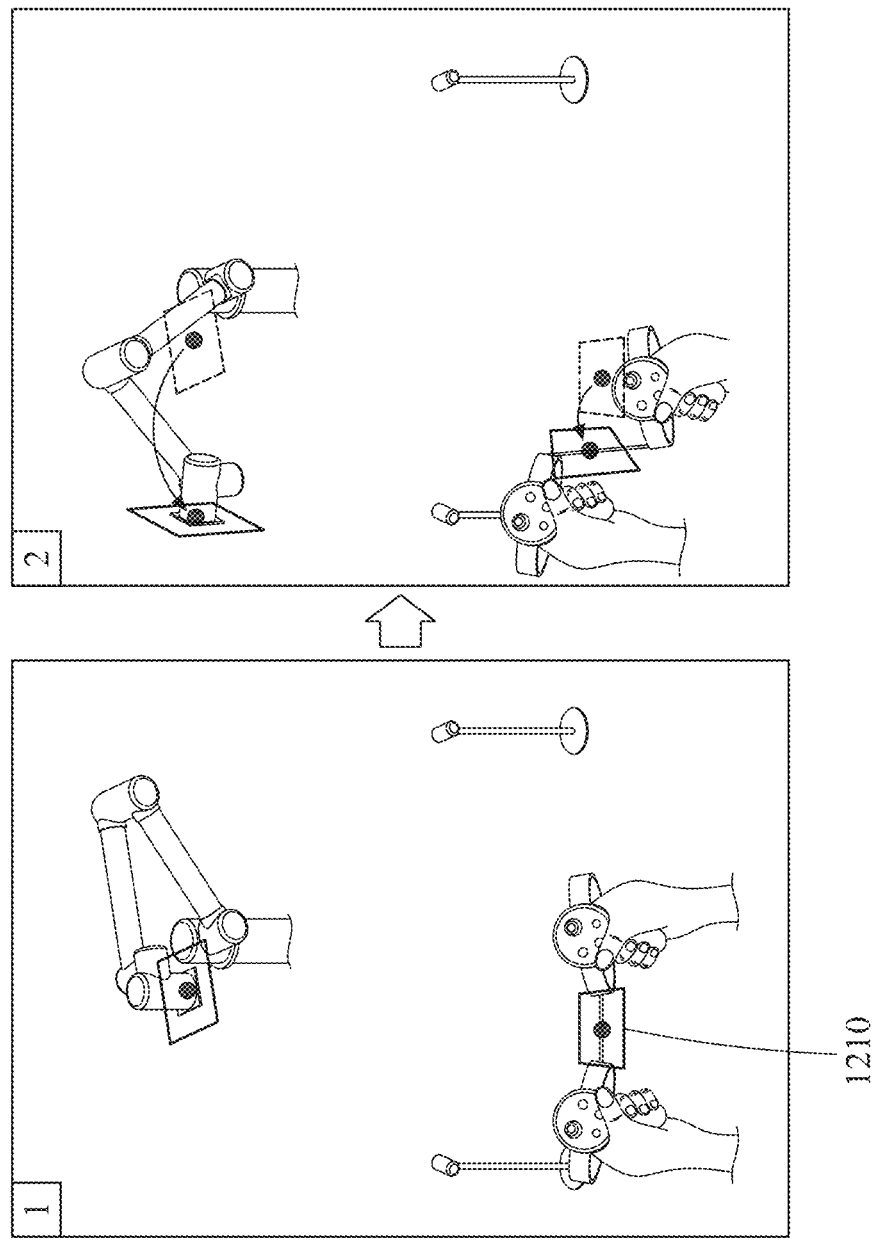
Figure 12B:
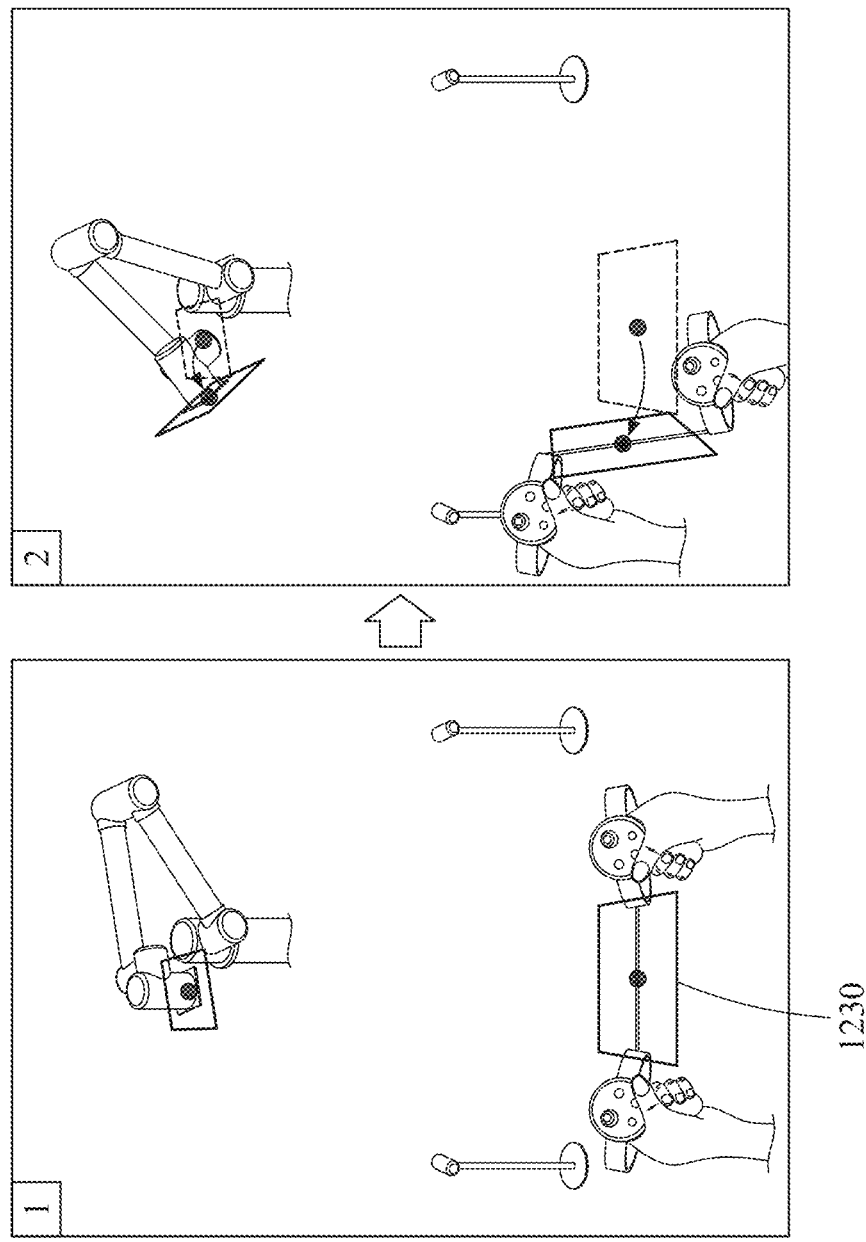
Figure 13:
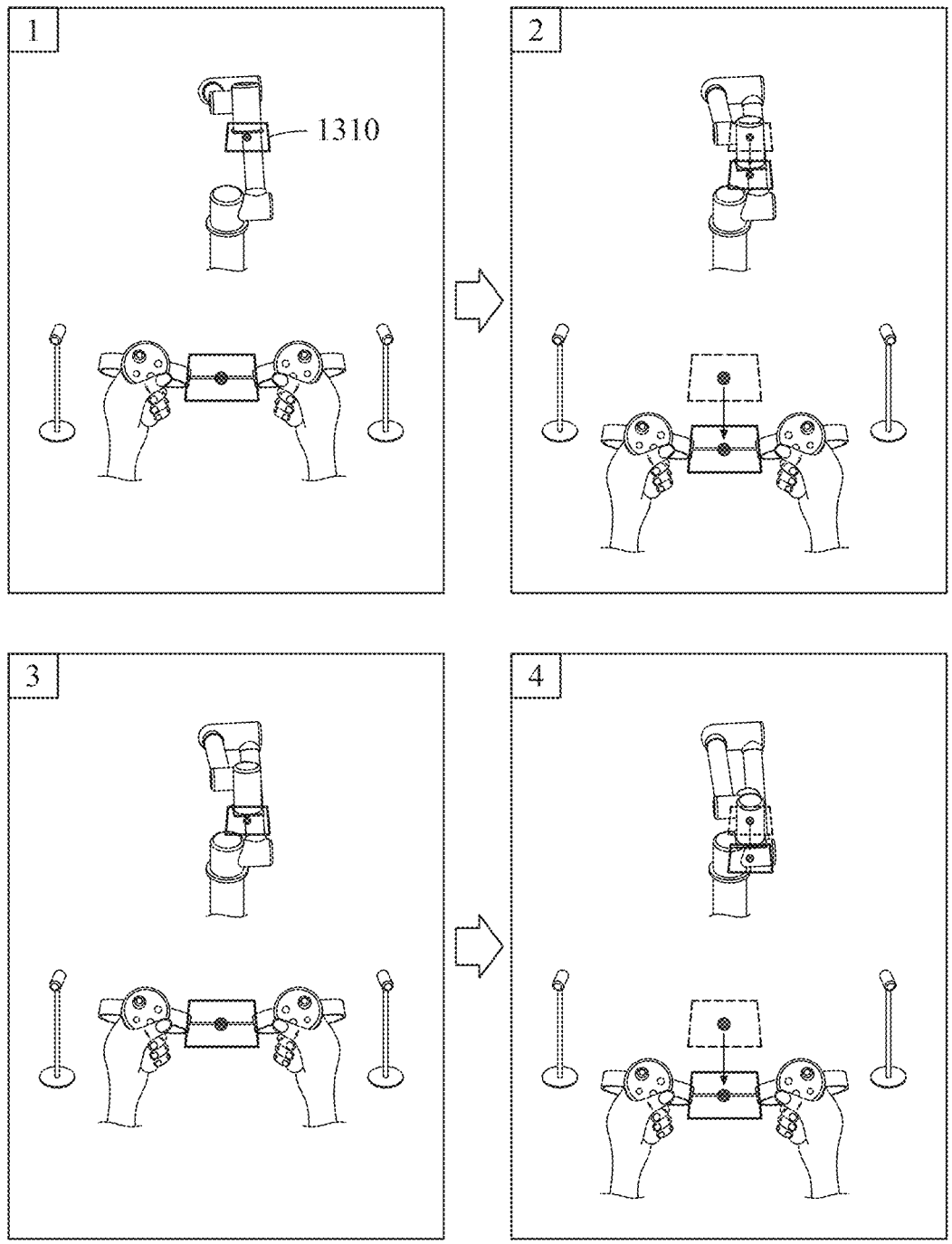

FIGS. 11 through 13 illustrate a process of controlling a motion of an end portion of an object according to an embodiment.

Referring to FIG. 11, an end portion of an object may be moved based on a user input. First, an end portion 1110 of an object may be identified and mapped to a reference plane 1130 defined by controllers. The reference plane 1130 is defined by the controllers and may include a line segment connecting the controllers in a 3D space. An end portion 1150 of an object may be moved based on at least one of a translation variation amount and a rotation variation amount of a reference plane 1170.

Referring to FIG. 12, the precision and the speed of the object control may be adjusted according to a distance between the controllers.

The controllers may be connected to each other by a support member, and thus a tensile force according to the distance between the controllers may be applied to the controllers. For example, a great tensile force may be generated when the distance between the controllers is long, and the tensile force may be transmitted to both hands of the user gripping the controllers.

In the example of FIG. 12, the size of a reference plane 1210 may be determined according to the distance between the controllers. The reference plane 1210 may be configured to control the end portion of the object. The reference plane 1210 may be set such that the controllers may be placed at edges thereof. A process of setting the reference plane 1210 will be described later with reference to FIG. 14.

The magnitude of a tensile force to be induced and a distance both hands need to move to input the same rotation variation amount may vary according to the distance between the controllers. Thus, through this principle, the precision and the speed of a control of rotating the object may be adjusted. For example, if the controllers are at a short distance, a weak tensile force is induced, and both hands need to move a short distance, such that the control of rotating the object may be performed with decreased precision but with increased speed. Conversely, if the controllers is at a long distance, a strong tensile force is induced, and both hands need to move a long distance, such that the control of rotating the object may be performed with increased precision but with decreased speed.

Further, the magnitude of a tensile force induced to the support member may vary according to the distance between the controllers. Thus, through this principle, the precision of control of translating the object may be adjusted. For example, if the controllers are at a short distance, a weak tensile force is induced, such that the control of translating the object may be performed with decreased precision. Conversely, if the controllers are at a long distance, a strong tensile force is induced, such that the control of translating the object may be performed with increased precision.

In some embodiments, the distance between the controllers may be applied to the corresponding ratio described above, examples of which are shown in FIGS. 12A and 12B. FIG. 12A illustrates an example in which controllers are at a short distance 1210, and FIG. 12B illustrates an example in which controllers are at a long distance 1230. As shown in FIGS. 12A and 12B, an example of controlling an object using the controllers that are at the long distance 1230 may bring about a relatively small translation variation amount and/or a relatively small rotation variation amount of an end portion of an object, when compared to an example of controlling the object using the controllers that are at the short distance 1210. That is, a relatively small corresponding ratio may be set for the example of controlling the object using the controllers that are at the long distance 1230, when compared to the example of controlling the object using the controllers that are at the short distance 1210. Thus, as the distance between the controllers is long, the translation variation amount and/or the rotation variation amount of the reference plane may be determined to be small. Conversely, as the distance between the controllers is short, the translation variation amount and/or the rotation variation amount of the reference plane may be determined to be great.

Referring to FIG. 13, a clutching operation may be applied to the control of an end portion of an object. By overlapping repetitive motions even within the restricted ranges of motion of the controllers, the clutching operation that enables an object control in a wider range of motion may be applied.

In the example of FIG. 13, if an end portion 1310 of the object is to be controlled, a user may perform an object control by moving the controllers while pressing buttons included in the controllers, adjust the positions of the controllers with the hands off the buttons, and then perform the object control by moving the controllers while pressing the buttons again. In doing so, the object control not limited to the ranges of motion of the controllers may be performed.

Figure 14A:
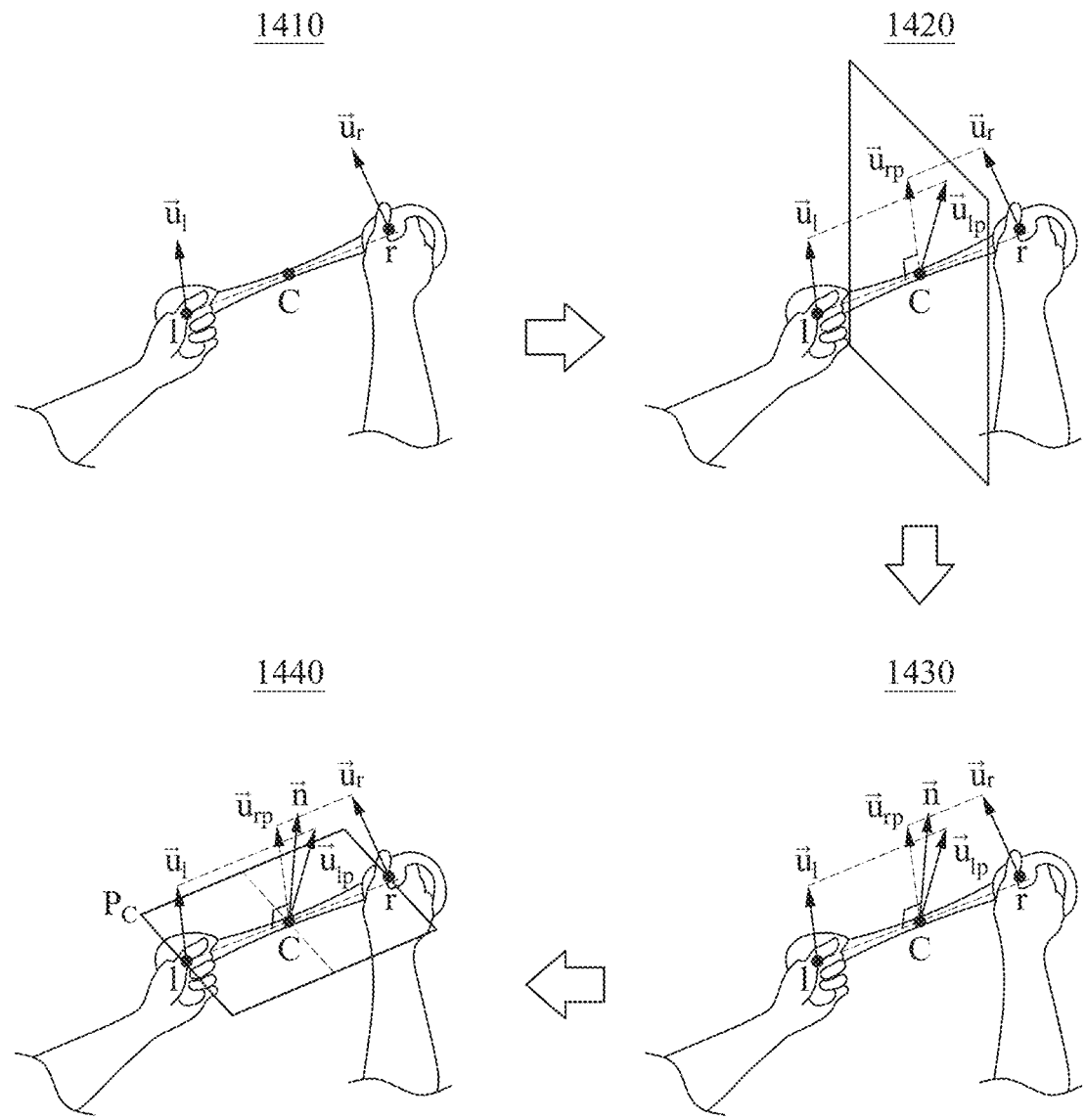
FIGS. 14A and 14B illustrate a process of determining a translation amount and a rotation amount of an end portion of an object according to an embodiment.
Figure 14B:
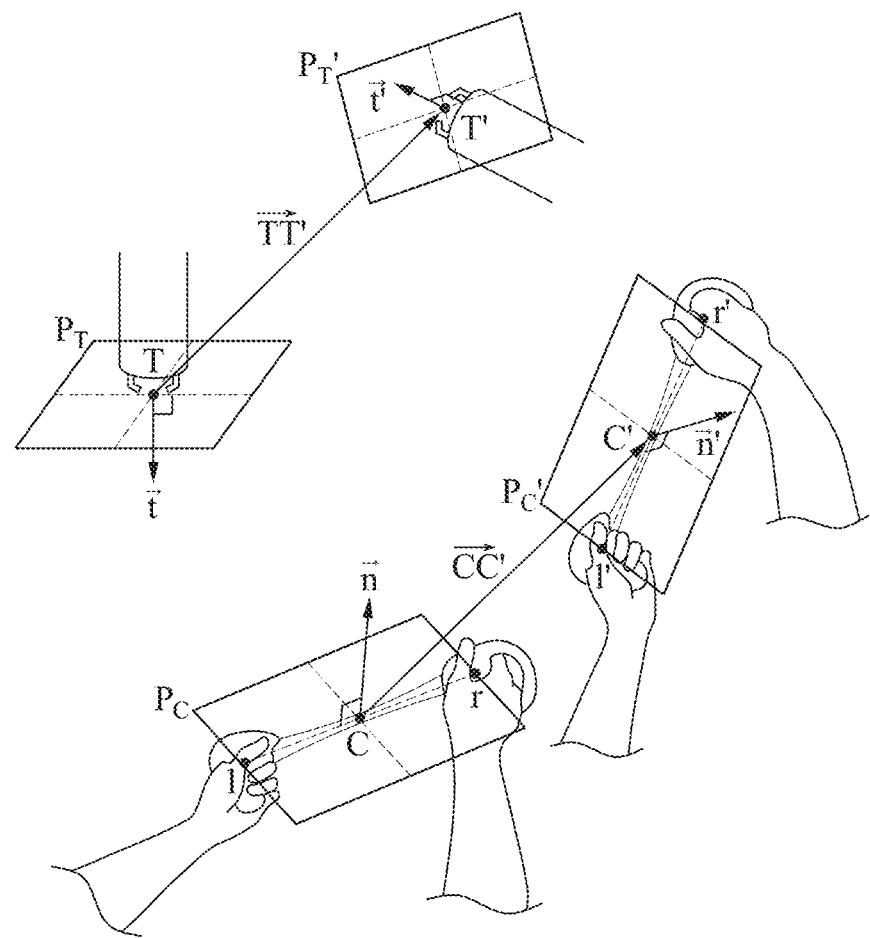

FIGS. 14A and 14B illustrate a process of determining a translation amount and a rotation amount of an end portion of an object according to an embodiment.

Referring to FIG. 14A, a process of determining a reference plane is illustrated. A reference plane may be determined for a mathematical expression with respect to translation and rotation. In this example, respective positions of controllers may be center points of facing sides of the reference plane.

In operation 1410, first vectors $\vec{u}_l$ and $\vec{u}_r$ respectively perpendicular to the controllers may be obtained. The first vectors $\vec{u}_l$ and $\vec{u}_r$ may respectively indicate upward vectors of the controllers.

In operation 1420, a temporary plane which is perpendicular to a line segment $\overline{lr}$ connecting the controllers or penetrates through the line segment $\overline{lr}$, while passing through a central position C of the controllers or a predetermined position on the line segment $\overline{lr}$ may be determined, and projected vectors $\vec{u}_{lp}$ and $\vec{u}_{rp}$ may be obtained by projecting the first vectors $\vec{u}_l$ and $\vec{u}_r$ to the temporary plane. The projected vectors $\vec{u}_{lp}$ and $\vec{u}_{rp}$ may be perpendicular to the line segment $\overline{lr}$.

In operation 1430, a second vector $\vec{n}$ may be determined by performing a vector operation such as an average between the projected vectors $\vec{u}_{lp}$ and $\vec{u}_{rp}$.

In operation 1440, a reference plane which is perpendicular to the second vector $\vec{n}$ and includes the line segment $\overline{lr}$ for example, includes the line segment $\overline{lr}$ as a horizontal axis, while passing through the central position C of the controllers may be determined. The second vector $\vec{n}$ may be a normal vector of the reference plane.

The reference plane determined as described above may not be visually displayed. Further, since only a translation variation amount and a rotation variation amount of the reference plane are used, the reference plane may not match a plate at an end portion of a real object.

Referring to FIG. 14B, a translation amount and a rotation amount of the end portion of the object may be calculated.

The end portion of the object may be translated according to the translation variation amount of the center point C of the reference plane. In FIG. 14B, C denotes the position before translation, and C' denotes the position after translation. Thus, $\overrightarrow{CC'}$ may denote the translation variation amount of the reference plane.

The translation amount $\overrightarrow{TT'}$ of the end portion of the object may be determined using Equation 1.

$$\overrightarrow{TT'}=y\cdot\overrightarrow{CC'} \quad \text{[Equation 1]}$$

In Equation 1, y denotes a corresponding ratio of the translation amount of the end portion of the object to the translation variation amount of the center point C of the reference plane, and may be set in various manners. The corresponding ratio may be determined based on the size of the reference plane corresponding to the distance between the controllers. For example, a relatively small corresponding ratio may be applied for a relatively large reference plane, such that the translation amount of the end portion of the object may be determined to be smaller than the translation variation amount of the center point C of the reference plane. In another example, a corresponding ratio set by a user or determined according to a situation in which the object is controlled may be applied to determine the translation amount of the end portion of the object.

Further, the end portion of the object may be rotated according to the rotation variation amount of the normal vector perpendicular to the reference plane. In FIG. 14B, $\vec{n}$ denotes the normal vector of the reference plane before rotation, and $\vec{n}'$ denotes the normal vector of the reference plane after rotation. A quaternion may be used to express the rotation variation amount of the reference plane, and the rotation variation amount of the reference plane may be denoted by $q_{P_C-P_C}'$. Here, q denotes the quaternion that defines rotation, $P_C$ denotes the reference plane before rotation, and $P_C'$ denotes the reference plane after rotation.

The rotation amount of the end portion of the object may be determined using Equation 2.

$$q_{P_r-P_r}'=\text{Scale}(x,q_{P_C-P_C}') \quad \text{[Equation 2]}$$

In Equation 2, $q_{P_r-P_r}'$ denotes the rotation amount of the end portion of the object. x denotes a corresponding ratio of the rotation amount of the end portion of the object to the rotation variation amount of the normal vector perpendicular to the reference plane, and may be set in various manners. The corresponding ratio may be determined based on the size of the reference plane corresponding to the distance between the controllers, or set by the user, or adaptively determined depending on a situation in which the object is controlled.

When at least one of the translation amount and the rotation amount of the end portion of the object is determined as described above, a rotation amount of each axis of the object may be determined through an inverse kinematic scheme, such that the object may be rotated.

Figure 15:
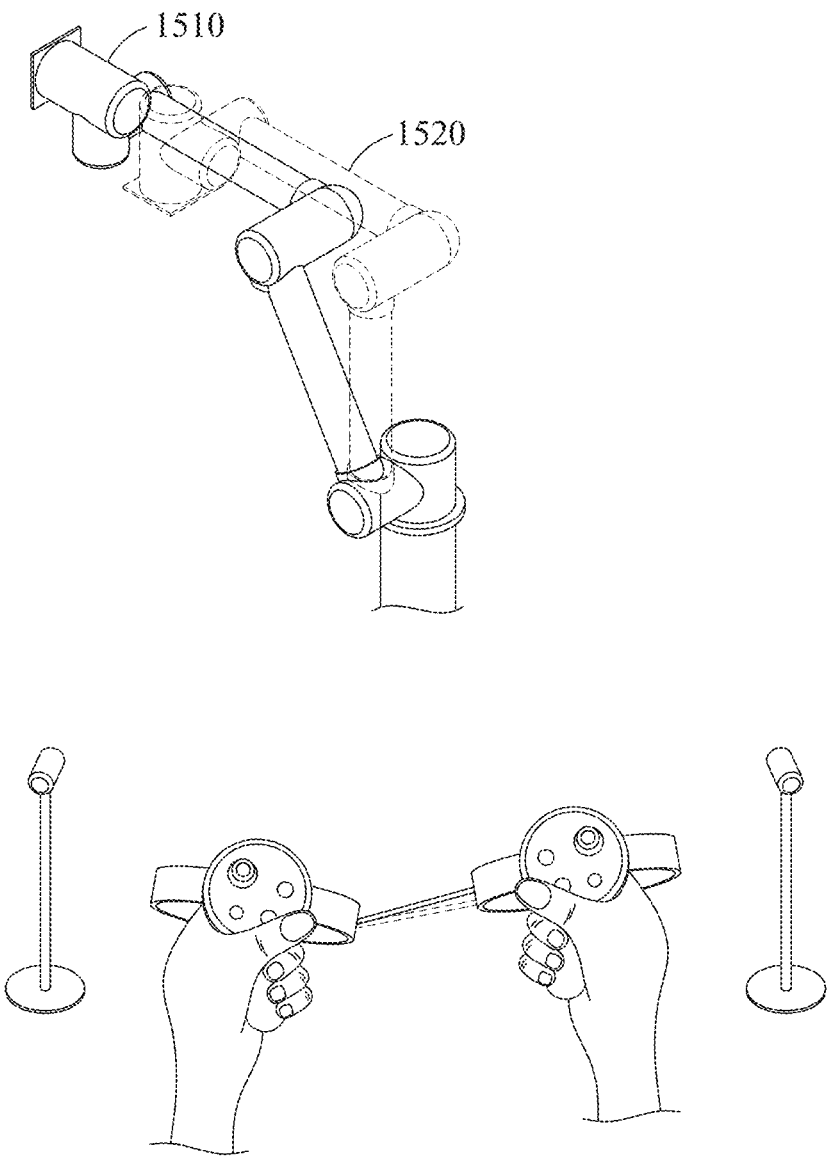
FIG. 15 illustrates a process of visually providing an expected motion of an object to be controlled according to an embodiment.

FIG. 15 illustrates a process of visually providing an expected motion of an object to be controlled according to an embodiment.

Referring to FIG. 15, an expected motion 1520 to be performed when an object 1510 is controlled according to a user input is illustrated.

The object 1510 may not be controlled promptly according to the user input, but rather the expected motion 1520 to be performed when the object 1510 is controlled according to the user input may be visually displayed and provided to the user. For example, the expected motion 1520 may be displayed to be semitransparent on an HMD that the user is wearing, and displayed simultaneously with a real space. After checking the expected motion 1520 of the object 1510 according to the user input, the user may provide an instruction to control the object, and the object 1510 may be controlled in practice according to the instruction.

When the expected motion 1520 of the object 1510 is visually provided to the user, the user may check and correct in advance a motion of the object 1510 to be controlled according to the user input, thereby performing the object control more exquisitely.

The descriptions provided above relate to an embodiment of implementing the object control, and there are various other embodiments that may be implemented. For example, the object control method and device may control an object by determining a user input from one or two controllers (See FIGS. 16 through 25), or may control an object by determining a user input from one or two hands, without using controllers (See FIGS. 26 through 35). This will be described in detail with reference to the following drawings.

FIGS. 16 through 20 illustrate examples of controlling an end portion of an object using one or two controllers according to an embodiment.

Figure 16:
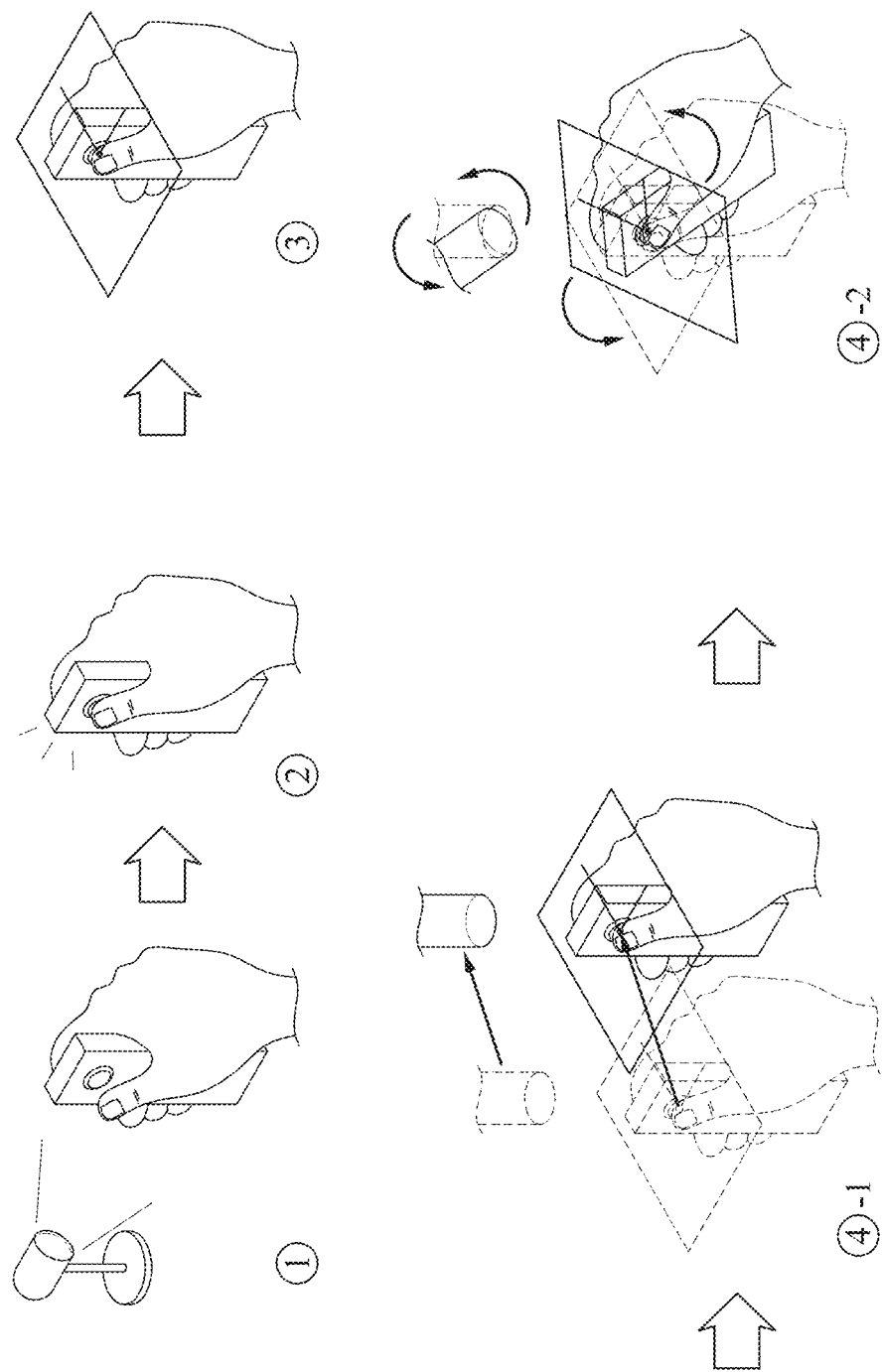
FIGS. 16 through 20 illustrate examples of controlling an end portion of an object using one or two controllers according to an embodiment.

Referring to FIG. 16, an example to describe a process of controlling an end portion of an object using one controller is illustrated.

First, through sensors, a position and an angle of a controller gripped by the user with one hand may be tracked in real time. For example, the sensors may include an image sensor, and an infrared sensor. The controller may include a separate element for improving the tracking accuracy of the sensors. However, in some examples, the separate element may not be included.

When a button of the controller is pressed by the user, a control mode may be activated. That is, whether the button of the controller is selected may be detected, and if the button of the controller is selected, the control mode may be activated. Conversely, when the button of the controller is not selected, the control mode may be deactivated. While the control mode is deactivated, the object control may not be performed. Here, pressing the button of the controller by the user may correspond to generating a control activation/deactivation command, in particular, a command to activate the control, by the user.

During the operation in the control mode, a reference plane which is centered at the position of the button of the controller and the position and the rotation of which are fixed relative to the body of the controller may be determined. In this example, the reference plane is a virtual plane for the object control and may be mapped to an end portion of an object to be controlled.

During the operation in the control mode, the position of the end portion of the object may be controlled by applying a translation variation amount with respect to a center point of the reference plane to the end portion of the object. That is, a user input may be determined based on the translation variation amount of the reference plane, and the position of the end portion of the object may be controlled according to the determined user input. For example, a second reference plane the position and the rotation of which are fixed relative to the end portion of the object may be determined, and the second reference plane may be translated according to the translation variation amount with respect to the center point of the reference plane, whereby the position of the end portion of the object may be controlled.

Further, during the operation in the control mode, a rotation of the end portion of the object may be controlled by applying a rotation variation amount with respect to the center point of the reference plane to the end portion of the object. That is, a user input may be determined based on the rotation variation amount of the reference plane, and the rotation of the end portion of the object may be controlled according to the determined user input. For example, a second reference plane the position and the rotation of which are fixed relative to the end portion of the object may be determined, and the second reference plane may be rotated according to the rotation variation amount with respect to the center point of the reference plane, whereby the rotation of the end portion of the object may be controlled.

In this example, only the position of the end portion of the object may be controlled if there is only the translation variation amount with respect to the center point of the reference plane, and only the rotation of the end portion of the object may be controlled if there is only the rotation variation amount with respect to the center point of the reference plane, and both the position and the rotation of the end portion of the object may be controlled if there are both the translation variation amount and the rotation variation amount with respect to the center point of the reference plane. That is, the user input may be determined based on at least one of the translation variation amount and the rotation variation amount of the reference plane, and at least one of the position and the rotation of the end portion of the object may be controlled according to the determined user input.

Further, in some examples, a predetermined corresponding ratio may be applied to the translation variation amount with respect to the center point of the reference plane to determine the user input. Basically, the corresponding ratio may be determined to be "1", and the translation variation amount with respect to the center point of the reference plane may be applied as is to the user input, such that the position of the end portion of the object may be translated as much as the translation variation amount with respect to the center point of the reference plane. Further, the corresponding ratio may be adaptively determined based on a translation velocity with respect to the center point of the reference plane. For example, the corresponding ratio may be determined to be greater than "1" as the translation velocity of the center point of the reference plane is fast, such that the position of the end portion of the object may be translated more than the translation variation amount with respect to the center point of the reference plane. Conversely, the corresponding ratio may be determined to be smaller than "1" as the translation velocity of the center point of the reference plane is slow, such that the position of the end portion of the object may be translated less than the translation variation amount with respect to the center point of the reference plane. In addition to the translation velocity with respect to the center point of the reference plane, various elements may be used without limitation for the determination of the corresponding ratio. Similarly, a predetermined corresponding ratio may be applied to the rotation variation amount with respect to the center point of the reference plane to determine the user input, and since the description provided above may also apply thereto, a detailed description will be omitted.

The corresponding ratio may be associated with the control precision. When the corresponding ratio is less than "1", the variation amount of the reference plane may be less reflected in the end portion of the object, and thus the control precision may increase. Conversely, when the corresponding ratio is greater than "1", the variation amount of the reference plane may be more reflected in the end portion of the object, and thus the control precision may decrease.

Figure 17:
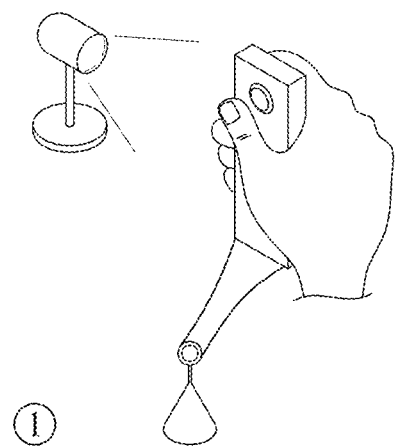

Referring to FIG. 17, an example in which a single controller is connected to a support member is illustrated. The controller in the example of FIG. 16 may be additionally connected to the support member. For example, the support member may connect the controller to a fixed position and besides, be connected to various parts such as a belt and a foot of the user. By stabilizing motions of a hand gripping the controller through the support member, the control accuracy may improve, and the precision and the speed of the object control may be adaptively adjusted according to a work circumstance.

For example, the support member may include a length-variable member having elasticity and a length-variable member having no elasticity. Here, the length-variable member having elasticity may be a stretchable material such as a rubber band or a spring. The length-variable member having no elasticity may be a non-stretchable material such as a mechanical linkage or a multi-joint member.

Figure 18:
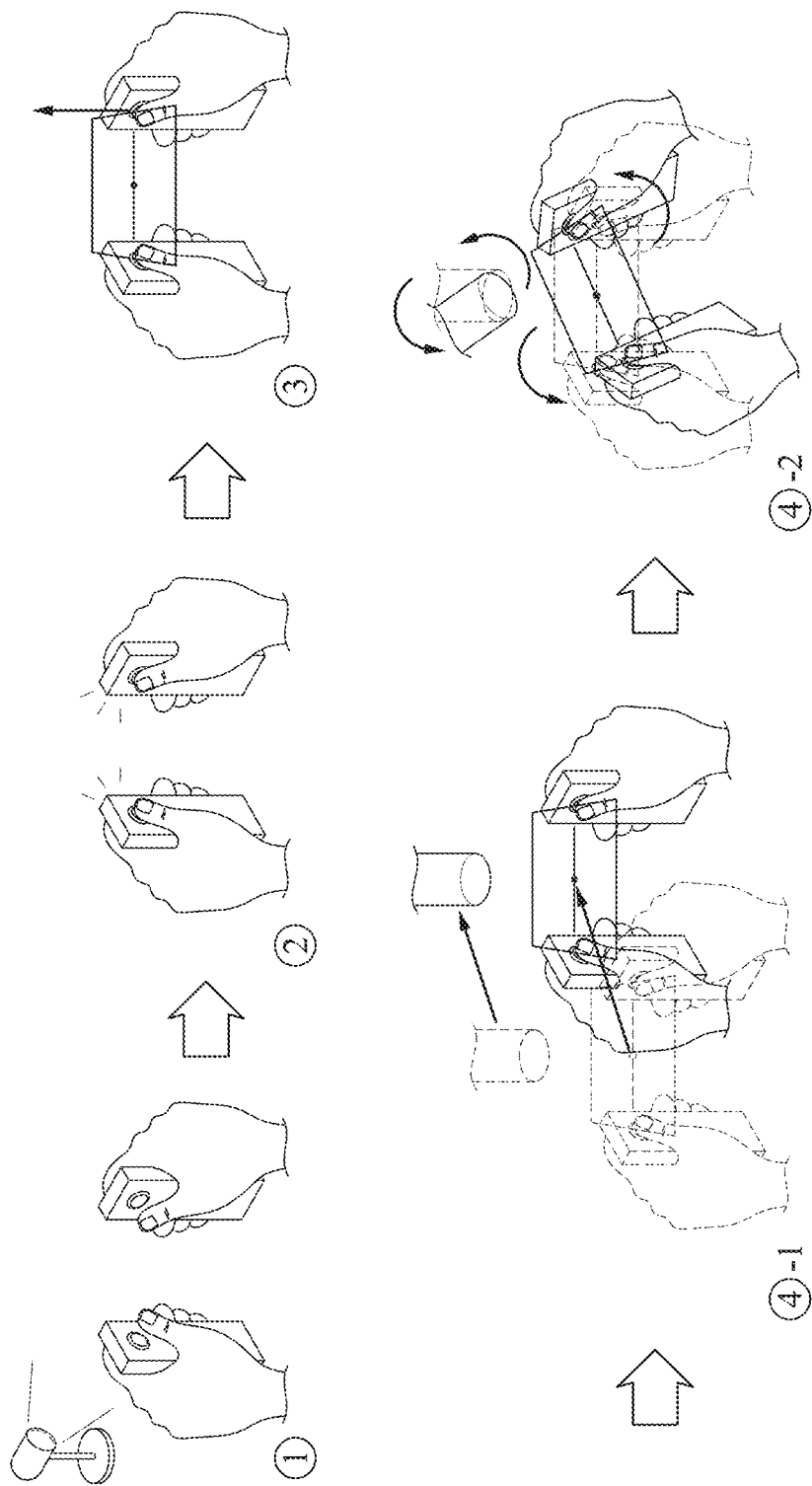

Referring to FIG. 18, an example to describe a process of controlling an end portion of an object using two controllers is illustrated.

First, through sensors, positions and angles of controllers gripped by the user with two hands may be tracked in real time. For example, the sensors may include an image sensor, and an infrared sensor. Each of the controllers may include a separate element for improving the tracking accuracy of the sensors. However, in some examples, the separate element may not be included.

When buttons of the controllers are pressed by the user, a control mode may be activated. That is, whether the buttons of the controllers are selected may be detected, and if the buttons of the controllers are selected, the control mode may be activated. In this example, the respective buttons of the two controllers should be selected to activate the control mode, and if any one of the buttons of the controllers is not selected, the control mode may be deactivated.

During the operation in the control mode, a reference plane that penetrates through the positions of the buttons of the controllers, is centered at a midpoint of the positions of the buttons of the controllers, and has a normal direction fixed relative to a body of one controller may be determined. In this example, the reference plane is a virtual plane for the object control and may be mapped to an end portion of an object to be controlled.

During the operation in the control mode, the position of the end portion of the object may be controlled by applying a translation variation amount with respect to a center point of the reference plane to the end portion of the object. Further, during the operation in the control mode, a rotation of the end portion of the object may be controlled by applying a rotation variation amount with respect to the center point of the reference plane to the end portion of the object. The description provided with reference to FIG. 16 may also apply to the process of controlling the position and/or the rotation of the end portion of the object based on the translation variation amount and/or the rotation variation amount with respect to the center point of the reference plane, and thus a detailed description will be omitted.

In addition, in some examples, a predetermined corresponding ratio may be applied to the translation variation amount with respect to the center point of the reference plane to determine the user input. The corresponding ratio may be determined based on a distance between the two controllers. The corresponding ratio may be determined to be greater than "1" as the distance between the two controllers is short, such that the position of the end portion of the object may be translated more than the translation variation amount with respect to the center point of the reference plane. Conversely, the corresponding ratio may be determined to be less than "1" as the distance between the two controllers is long, such that the position of the end portion of the object may be translated less than the translation variation amount with respect to the center point of the reference plane. In addition, various elements, such as a translation velocity and a rotation velocity with respect to the center point of the reference plane, may be used without limitation for the determination of the corresponding ratio. Similarly, a predetermined corresponding ratio may be applied to the rotation variation amount with respect to the center point of the reference plane to determine the user input, and since the description provided above may also apply thereto, a detailed description will be omitted.

Figure 19:
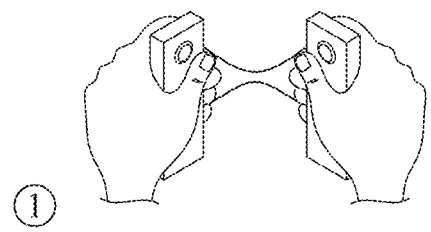

Referring to FIG. 19, an example in which two controllers are connected by a length-variable member is illustrated. The controllers in the example of FIG. 18 may be additionally connected by the length-variable member. By stabilizing motions of the hands gripping the controllers through the length-variable member, the control accuracy may improve, and the precision and the speed of the object control may be adaptively adjusted according to a work circumstance.

Figure 20:
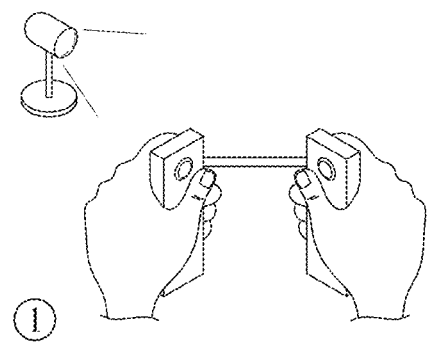

Referring to FIG. 20, an example in which two controllers are connected by a length-fixed member is illustrated. The controllers in the example of FIG. 18 may be additionally connected by the length-fixed member. For example, the length-fixed member may be a member which is non-stretchable and having an invariant length. The two controllers connected by the length-fixed member may be substantially a single member, like a gamepad or a remote control. By stabilizing motions of the hands gripping the controllers through the length-fixed member, the control accuracy may improve, and the precision and the speed of the object control may be adaptively adjusted according to a work circumstance.

FIGS. 21 through 25 illustrate examples of controlling an axial portion of an object using one or two controllers according to an embodiment.

Figure 21:
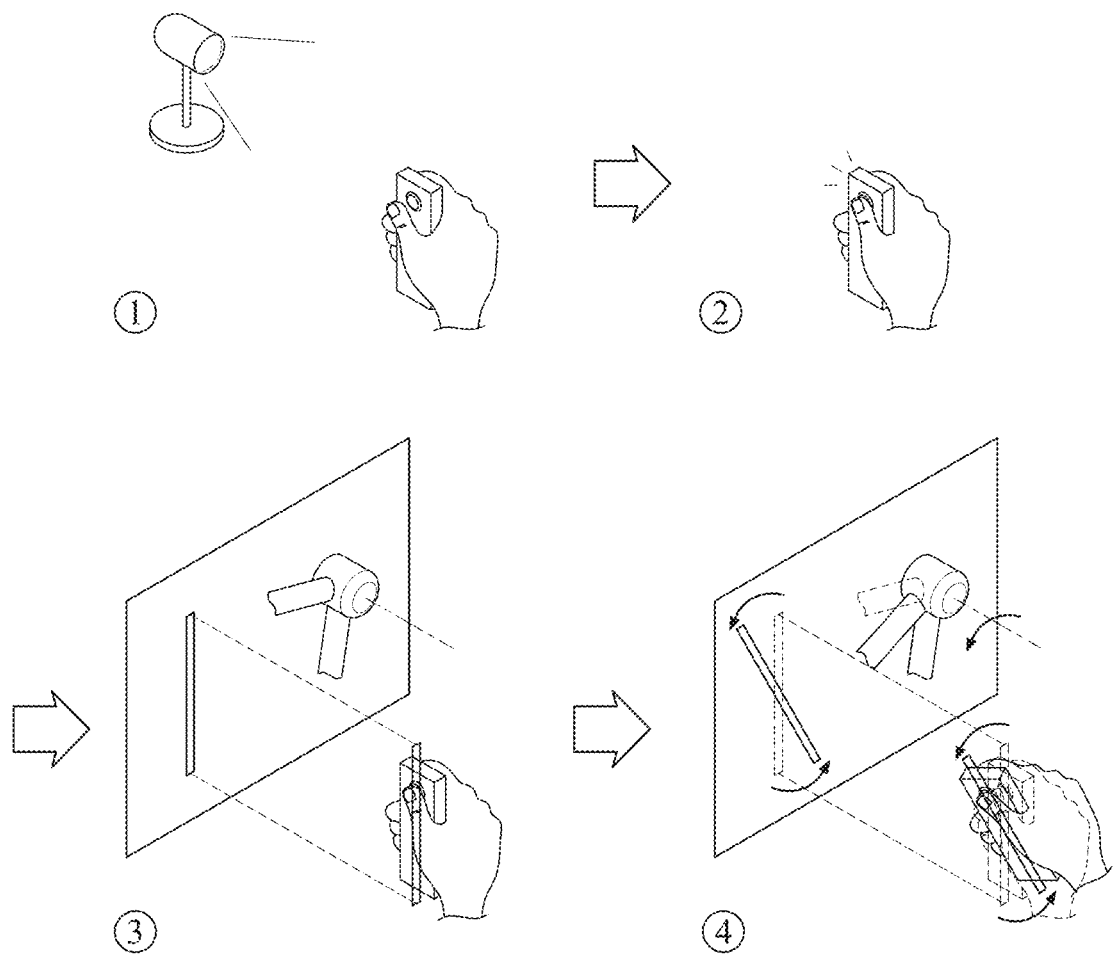
FIGS. 21 through 25 illustrate examples of controlling an axial portion of an object using one or two controllers according to an embodiment.

Referring to FIG. 21, an example to describe a process of controlling an axial portion of an object using one controller is illustrated. The object to be controlled may include at least one axial portion. If the object includes a plurality of axial portions, a process of selecting one axial portion to be controlled from among the plurality of axial portions may be performed.

First, through sensors, a position and an angle of a controller gripped by the user with one hand may be tracked in real time. For example, the sensors may include an image sensor, and an infrared sensor. The controller may include a separate element for improving the tracking accuracy of the sensors. However, in some examples, the separate element may not be included.

When a button of the controller is pressed by the user, a control mode may be activated. That is, whether the button of the controller is selected may be detected, and if the button of the controller is selected, the control mode may be activated. Conversely, if the button of the controller is not selected, the control mode may be deactivated.

During the operation in the control mode, a reference bar which penetrates through the position of the button of the controller and is parallel to the body of the controller and the position and the rotation of which are fixed relative to the controller may be determined. The determined reference bar may be projected perpendicularly to a plane perpendicular to the axis of the object to be controlled. In this example, the reference bar may be a virtual bar used for an object control.

Further, during the operation in the control mode, a rotation of the axial portion of the object may be controlled by applying a rotation variation amount of the projected reference bar to the axial portion of the object. That is, a user input may be determined based on the rotation variation amount of the projected reference bar, and the rotation of the end portion of the object may be controlled according to the determined user input.

In some examples, a predetermined corresponding ratio may be applied to the rotation variation amount of the projected reference bar to determine the user input. Basically, the corresponding ratio may be determined to be "1", and the rotation variation amount of the projected reference bar may be applied as is to the user input, such that the axial portion of the object may be rotated as much as the rotation variation amount of the projected reference bar. Further, the corresponding ratio may be adaptively determined based on a rotation velocity of the projected reference bar. For example, the corresponding ratio may be determined to be greater than "1" as the rotation velocity of the projected reference bar is fast, such that the axial portion of the object may be rotated more than the rotation variation amount of the projected reference bar. Conversely, the corresponding ratio may be determined to be less than "1" as the rotation velocity of the projected reference bar is slow, such that the axial portion of the object may be rotated less than the rotation variation amount of the projected reference bar. In addition, various elements may be used without limitation for the determination of the corresponding ratio.

Figure 22:
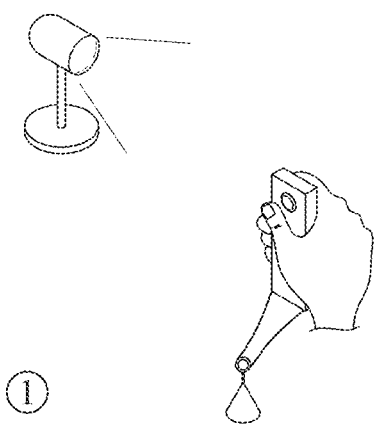

Referring to FIG. 22, an example in which a single controller is connected to a support member is illustrated. The controller in the example of FIG. 21 may be additionally connected to the support member. For example, the support member may connect the controller to a fixed position and besides, be connected to various parts such as a belt and a foot of the user. For example, the support member may include a length-variable member having elasticity and a length-variable member having no elasticity. By stabilizing motions of a hand gripping the controller through the support member, the control accuracy may improve, and the precision and the speed of the object control may be adaptively adjusted according to a work circumstance.

Figure 23:
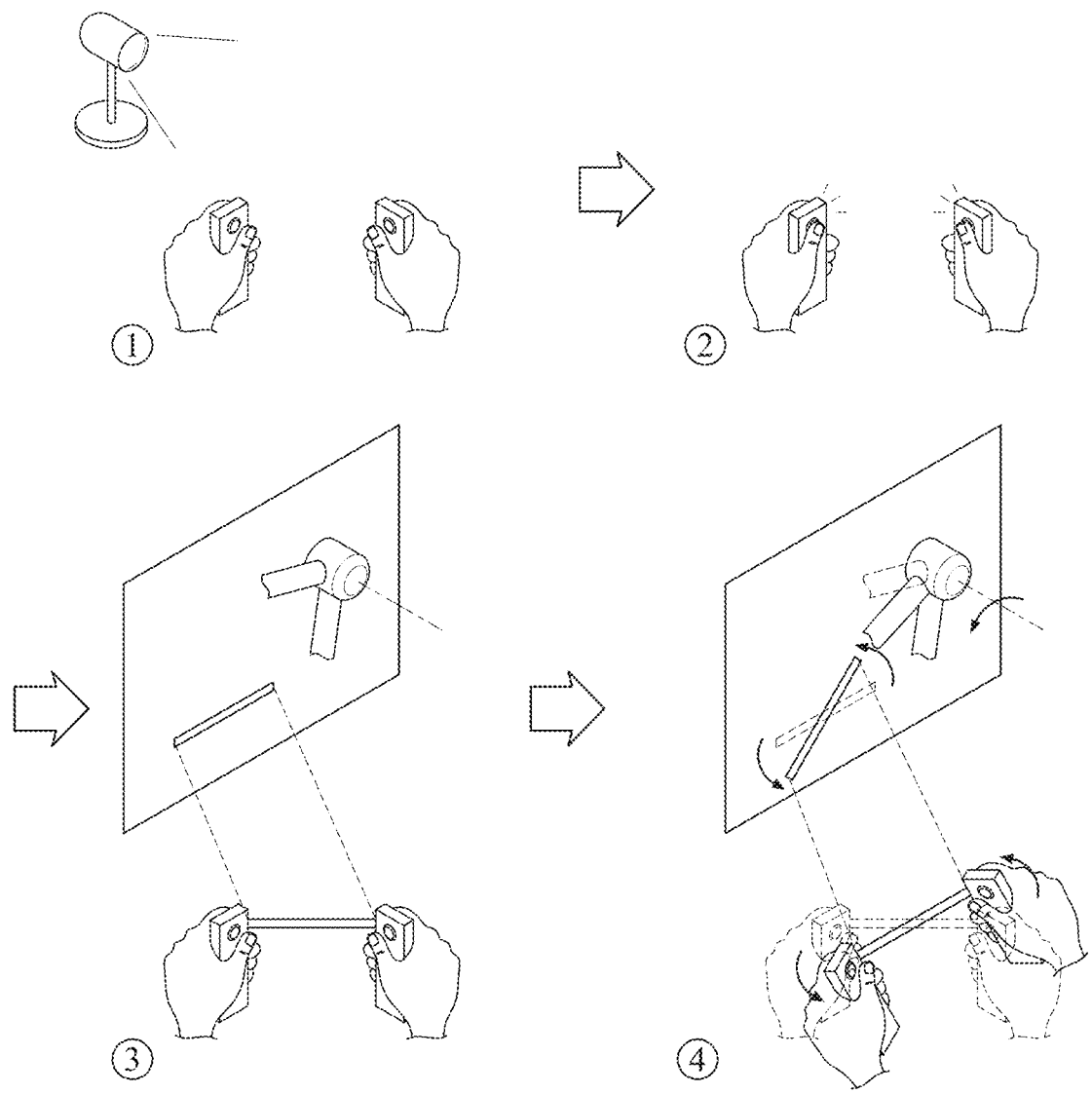

Referring to FIG. 23, an example to describe a process of controlling an axial portion of an object using two controllers is illustrated.

First, through sensors, positions and angles of controllers gripped by the user with two hands may be tracked in real time. For example, the sensors may include an image sensor, and an infrared sensor. Each of the controllers may include a separate element for improving the tracking accuracy of the sensors. However, in some examples, the separate element may not be included.

When buttons of the controllers are pressed by the user, a control mode may be activated. That is, whether the buttons of the controllers are selected may be detected, and if the buttons of the controllers are selected, the control mode may be activated. In this example, the respective buttons of the two controllers should be selected to activate the control mode, and if any one of the buttons of the controllers is not selected, the control mode may be deactivated.

During the operation in the control mode, a reference bar which penetrates through the positions of the buttons of the controllers may be determined. The determined reference bar may be projected perpendicularly to a plane perpendicular to the axis of the object to be controlled. In this example, the reference bar may be a virtual bar used for an object control.

Further, during the operation in the control mode, a rotation of the axial portion of the object may be controlled by applying a rotation variation amount of the projected reference bar to the axial portion of the object. That is, a user input may be determined based on the rotation variation amount of the projected reference bar, and the orientation of the end portion of the object may be controlled according to the determined user input.

In some examples, a predetermined corresponding ratio may be applied to the rotation variation amount of the projected reference bar to determine the user input. The corresponding ratio may be determined based on a distance between the two controllers. The corresponding ratio may be determined to be greater than "1" as the distance between the two controllers is short, such that the axial portion of the object may be rotated more than the rotation variation amount of the projected reference bar. Conversely, the corresponding ratio may be determined to be less than "1" as the distance between the two controllers is long, such that the axial portion of the object may be rotated less than the rotation variation amount of the projected reference bar. In addition, various elements, such as a rotation velocity of the projected reference bar, may be used without limitation for the determination of the corresponding ratio.

Figure 24:
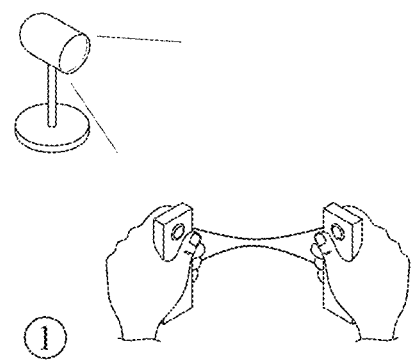
Figure 25:
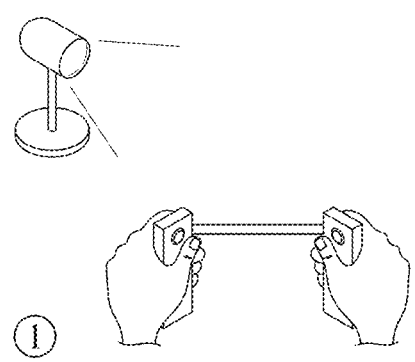

Referring to FIG. 24, an example in which two controllers are connected by a length-variable member is illustrated. Referring to FIG. 25, an example in which two controllers are connected by a length-fixed member is illustrated. The descriptions provided above may apply to the length-variable member and the length-fixed member, and thus a detailed description will be omitted.

FIGS. 26 through 30 illustrate examples of controlling an end portion of an object based on a user input determined from one or two hands according to an embodiment.

A user input may be determined based on motions of one or two hands of a user, without using controller(s), and an object may be controlled based on the determined user input. Since the user may not need to grip the controller(s), the degree of freedom of the motion of the user may improve, and the object may be controlled through more natural motions. Hereinafter, a detailed description will be provided with reference to the following drawings.

Figure 26:
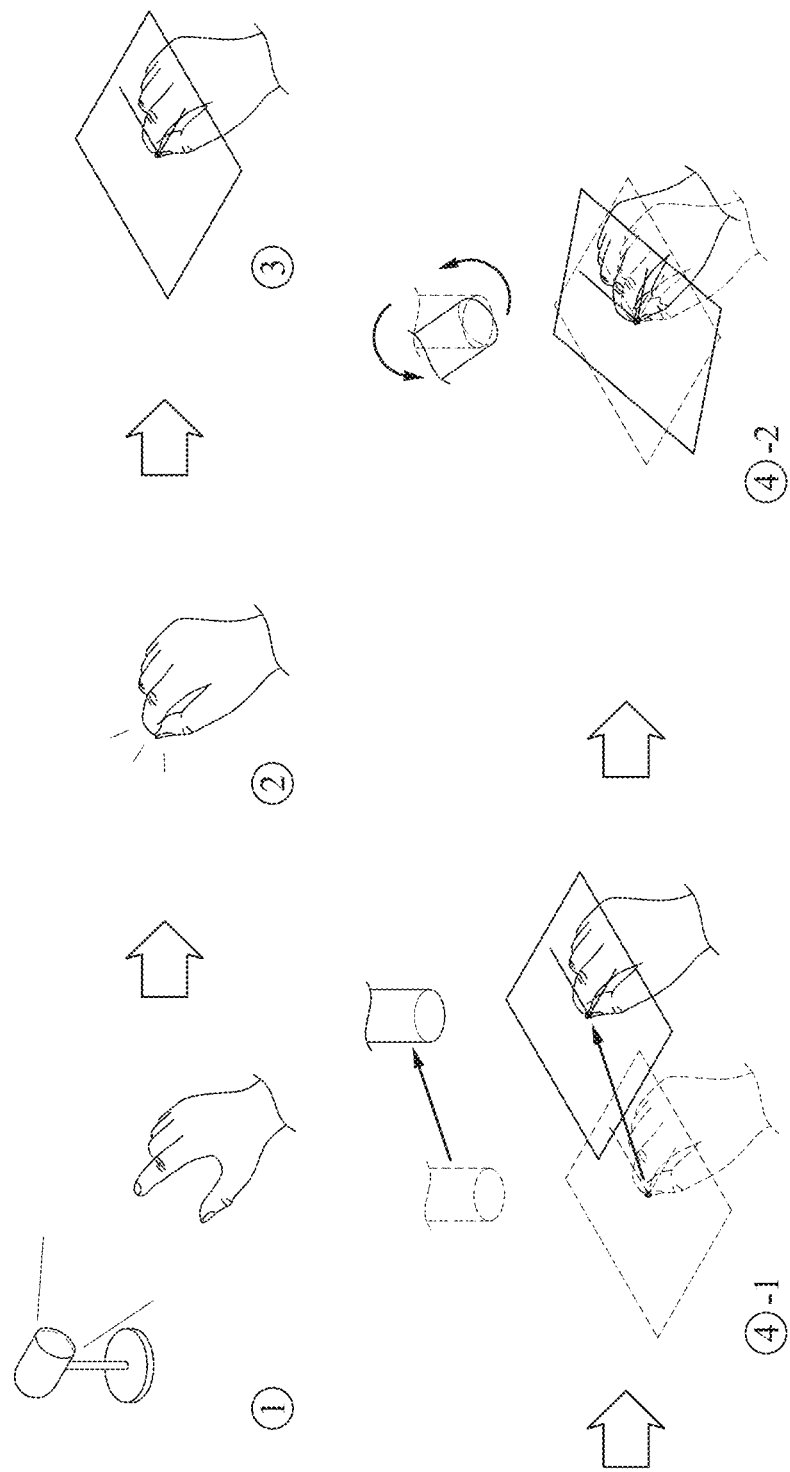
FIGS. 26 through 30 illustrate examples of controlling an end portion of an object based on a user input determined from one or two hands according to an embodiment.

Referring to FIG. 26, an example to describe a process of controlling an end portion of an object based on a user input determined from one hand of the user is illustrated.

First, through sensors, a position and an angle of one hand of the user, and joint angles of the thumb and the index finger may be tracked in real time. For example, the sensors may include an image sensor, and a depth sensor.

When the tip of the thumb and the tip of the index finger are in contact with each other, a control mode may be activated. Conversely, when the tips of the fingers are separate and not in contact with each other, the control mode may be deactivated. However, contacting the tip of the thumb and the tip of the index finger is merely provided as an example. The control mode may be activated when a predetermined gesture (for example, a predetermined hand gesture such as a fist) is detected from the user, and the control mode may be deactivated when the gesture disappears. Further, the embodiment is not limited to the thumb and the index finger. The control mode may be activated depending on whether at least two of the fingers of the user are in contact with each other. Here, contacting the tip of the thumb and the tip of the index finger may correspond to generating a control activation/deactivation command, in particular, a command to activate the control, by the user.

During the operation in the control mode, a reference plane which is centered at a contact point of the thumb and the index finger and includes an axis of the thumb and an axis of the index finger may be determined. The embodiment is not limited to the thumb and the index finger. A reference plane which is centered at a contact point of two fingers contacting each other and includes respective axes of the two contacting fingers may be determined. In this example, the reference plane is a virtual plane for the object control and may be mapped to an end portion of an object to be controlled.

During the operation in the control mode, the position of the end portion of the object may be controlled by applying a translation variation amount with respect to a center point of the reference plane to the end portion of the object. Further, during the operation in the control mode, a rotation of the end portion of the object may be controlled by applying a rotation variation amount with respect to the center point of the reference plane to the end portion of the object. In this example, only the position of the end portion of the object may be controlled if there is only the translation variation amount with respect to the center point of the reference plane, and only the orientation of the end portion of the object may be controlled if there is only the rotation variation amount with respect to the center point of the reference plane, and both the position and the rotation of the end portion of the object may be controlled if there are both the translation variation amount and the rotation variation amount with respect to the center point of the reference plane. Further, in some examples, a predetermined corresponding ratio may be applied to the translation variation amount with respect to the center point of the reference plane to determine the user input. The descriptions provided above may apply thereto, and thus a detailed description will be omitted.

Figure 27:
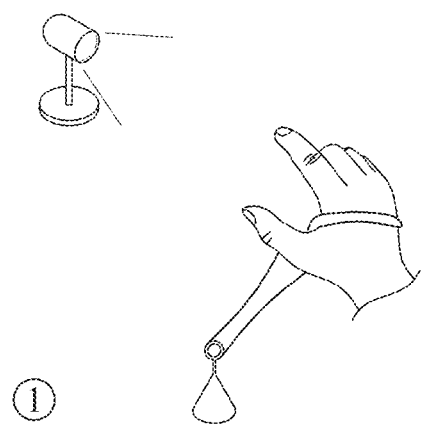

Referring to FIG. 27, an example in which one hand of a user is connected to a support member is illustrated. The hand of the user in the example of FIG. 26 may be additionally connected to the support member. For example, the support member may connect the controller to a fixed position and besides, be connected to various parts such as a belt and a foot of the user. For example, the support member may include a length-variable member having elasticity and a length-variable member having no elasticity. By stabilizing motions of the hand through the support member, the control accuracy may improve, and the precision and the speed of the object control may be adaptively adjusted according to a work circumstance.

Figure 28:
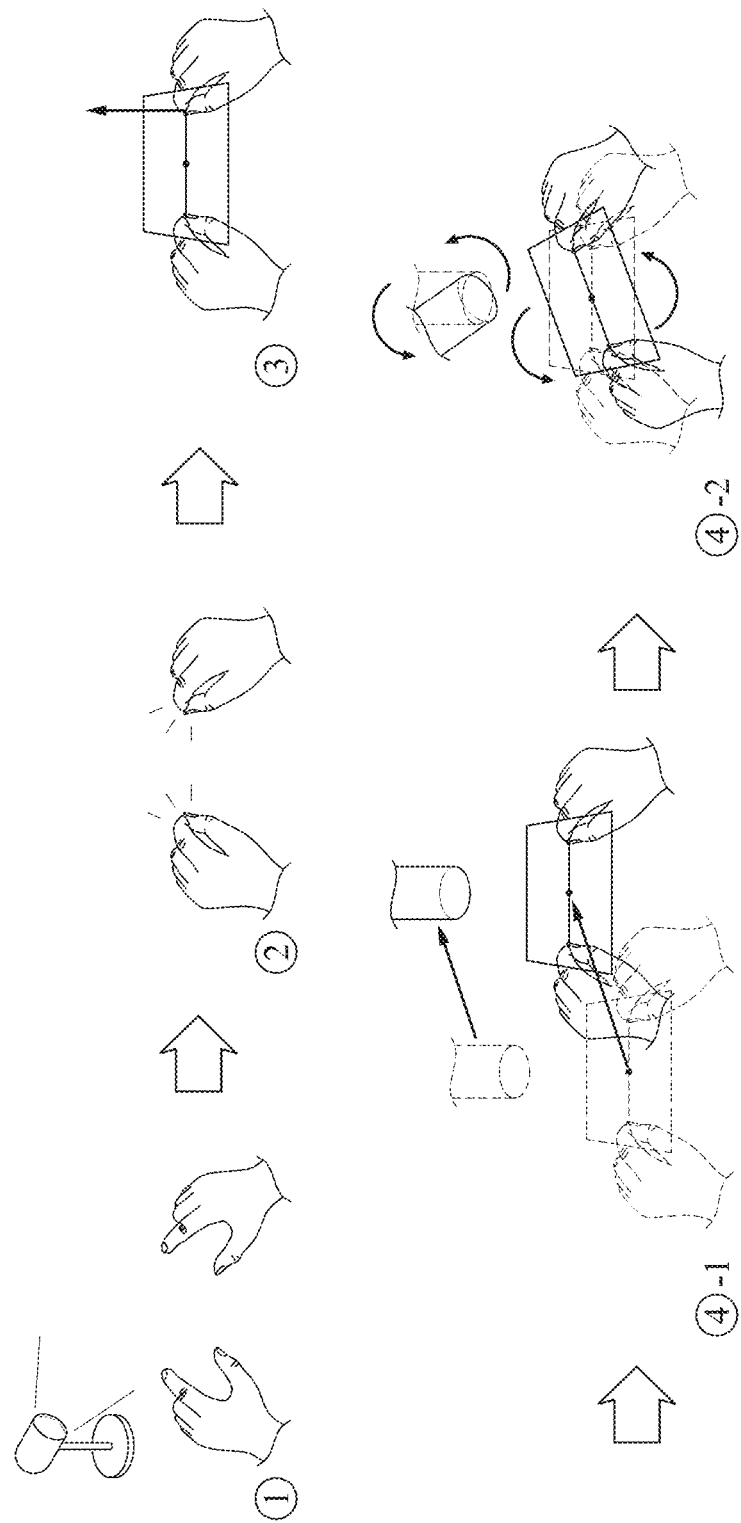

Referring to FIG. 28, an example to describe a process of controlling an end portion of an object based on a user input determined from two hands of the user is illustrated.

First, through sensors, positions and angles of the two hands of the user, and joint angles of the thumbs and the index fingers may be tracked in real time.

When the tips of the thumbs and the tips of the index fingers of the two hands are in contact with each other, a control mode may be activated. Conversely, when the tips of the fingers of the two hands are separate and not in contact with each other, the control mode may be deactivated. In this example, even when the tips of the fingers of one of the two hands are separate, the control mode may be deactivated. In addition, the activation of the control mode may be determined depending on whether a predetermined two-handed gesture is detected from the user.

During the operation in the control mode, a reference plane which penetrates through respective contact points of the fingers of the two hands, is centered at a midpoint of the contact points, and is perpendicular to an axis of the thumb of one of the two hands may be determined. In this example, the reference plane is a virtual plane for the object control and may be mapped to an end portion of an object to be controlled.

During the operation in the control mode, the position of the end portion of the object may be controlled by applying a translation variation amount with respect to a center point of the reference plane to the end portion of the object. Further, during the operation in the control mode, a rotation of the end portion of the object may be controlled by applying a rotation variation amount with respect to the center point of the reference plane to the end portion of the object. Further, in some examples, a predetermined corresponding ratio may be applied to the translation variation amount with respect to the center point of the reference plane to determine the user input. The corresponding ratio may be determined based on a distance between the two hands. The descriptions provided above may apply thereto, and thus a detailed description will be omitted.

Figure 29:
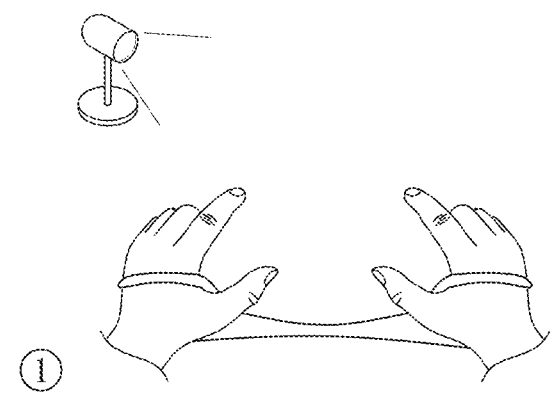

Referring to FIG. 29, an example in which two hands of a user are connected by a length-variable member is illustrated. The two hands of the user in the example of FIG. 28 may be additionally connected by the length-variable member. By stabilizing motions of the hands through the length-variable member, the control accuracy may improve, and the precision and the speed of the object control may be adaptively adjusted according to a work circumstance.

Figure 30:
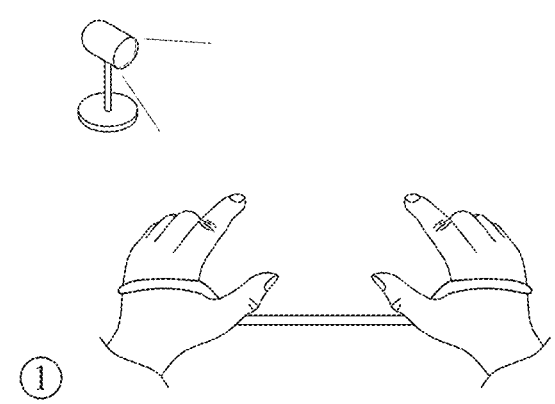

Referring to FIG. 30, an example in which two hands of a user are connected by a length-fixed member is illustrated. The two hands of the user in the example of FIG. 28 may be additionally connected by the length-fixed member. For example, the length-fixed member may be a member which is non-stretchable and having an invariant length. By stabilizing motions of the hands through the length-fixed member, the control accuracy may improve, and the precision and the speed of the object control may be adaptively adjusted according to a work circumstance.

FIGS. 31 through 35 illustrate examples of controlling an axial portion of an object based on a user input determined from one or two hands according to an embodiment.

Figure 31:
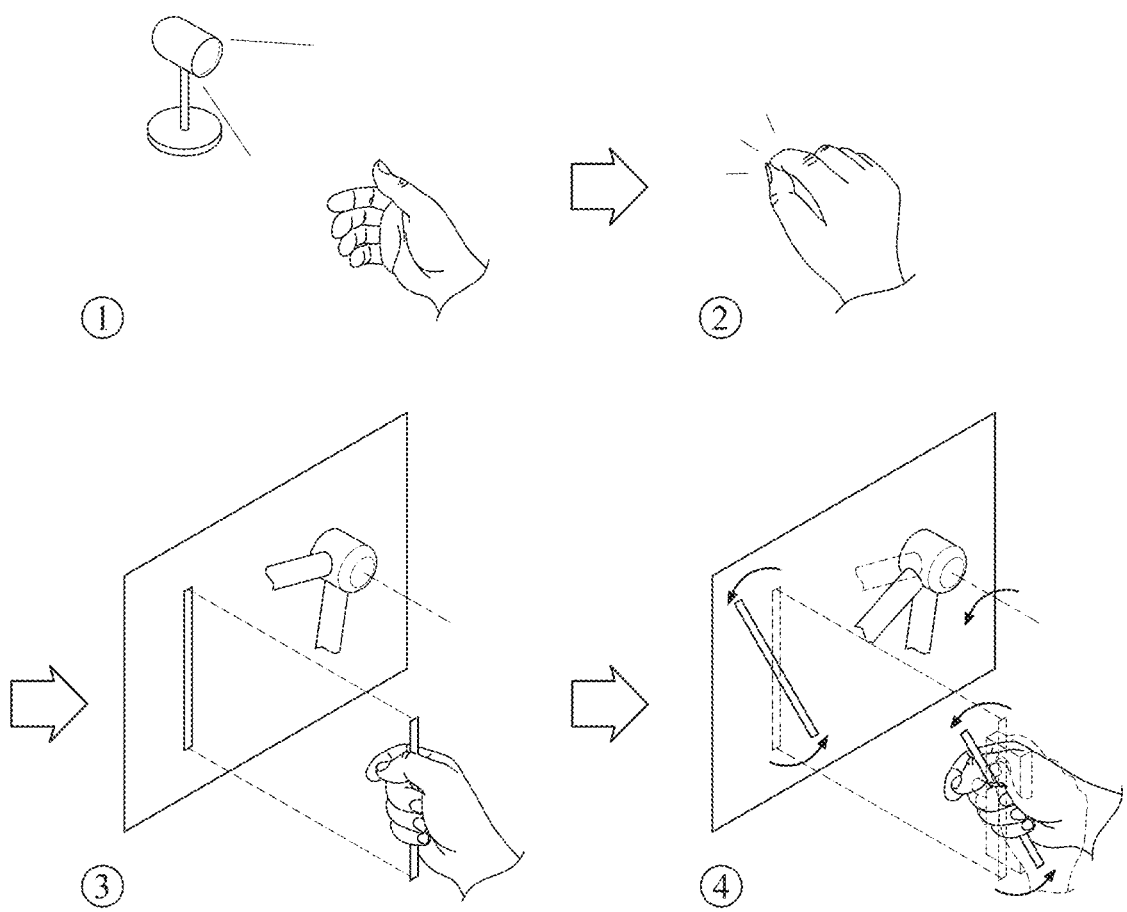
FIGS. 31 through 35 illustrate examples of controlling an axial portion of an object based on a user input determined from one or two hands according to an embodiment.

Referring to FIG. 31, an example to describe a process of controlling an axial portion of an object based on a user input determined from one hand of the user is illustrated. The object to be controlled may include at least one axial portion. If the object includes a plurality of axial portions, a process of selecting one axial portion to be controlled from among the plurality of axial portions may be performed.

First, through sensors, a position and an angle of one hand of the user, joint angles of the thumb and the index finger, and a position and an angle of a palm surface may be tracked in real time.

When the tip of the thumb and the tip of the index finger are in contact with each other, a control mode may be activated. Conversely, when the tips of the fingers are separate and not in contact with each other, the control mode may be deactivated. The descriptions provided above may apply thereto, and thus a detailed description will be omitted.

During the operation in the control mode, a reference bar which perpendicularly penetrates through the center of a loop formed by the thumb and the index finger and is parallel with the palm may be determined. The determined reference bar may be projected perpendicularly to a plane perpendicular to the axis of the object to be controlled. In this example, the reference bar may be a virtual bar used for an object control.

Further, during the operation in the control mode, a rotation of the axial portion of the object may be controlled by applying a rotation variation amount of the projected reference bar to the axial portion of the object. That is, a user input may be determined based on the rotation variation amount of the projected reference bar, and the rotation of the end portion of the object may be controlled according to the determined user input. In some examples, a predetermined corresponding ratio may be applied to the rotation variation amount of the projected reference bar to determine the user input. The descriptions provided above may apply thereto, and thus a detailed description will be omitted.

Figure 32:
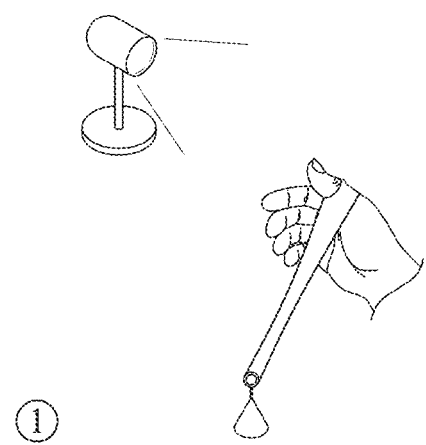

Referring to FIG. 32, an example in which one hand of a user is connected to a support member is illustrated. The one hand in the example of FIG. 31 may be additionally connected to the support member. For example, the support member may connect the controller to a fixed position and besides, be connected to various parts such as a belt and a foot of the user. For example, the support member may include a length-variable member having elasticity and a length-variable member having no elasticity. By stabilizing motions of the hand gripping the controller through the support member, the control accuracy may improve, and the precision and the speed of the object control may be adaptively adjusted according to a work circumstance.

Figure 33:
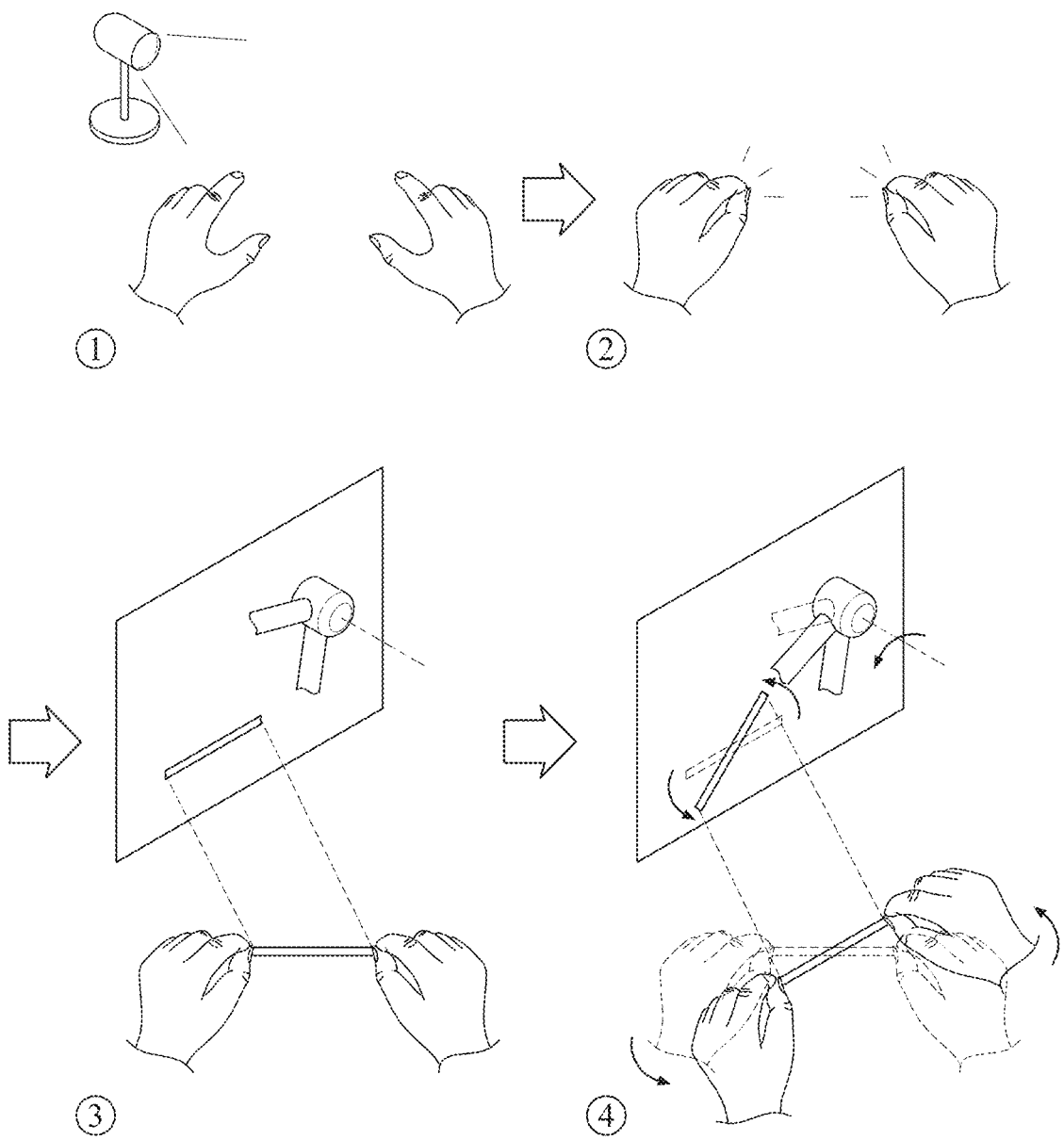

Referring to FIG. 33, an example to describe a process of controlling an axial portion of an object based on a user input determined from two hands of the user is illustrated.

First, through sensors, positions of the tips of the thumbs and the tips of the index fingers of the two hands of the user may be tracked in real time.

When the tips of the thumbs and the tips of the index fingers of the two hands are in contact with each other, a control mode may be activated. Conversely, when the tips of the fingers are separate and not in contact with each other, the control mode may be deactivated. The descriptions provided above may apply thereto, and thus a detailed description will be omitted.

During the operation in the control mode, a reference bar which penetrates through the contact points of the fingers of the two hands may be determined. The determined reference bar may be projected perpendicularly to a plane perpendicular to the axis of the object to be controlled.

Further, during the operation in the control mode, a rotation of the axial portion of the object may be controlled by applying a rotation variation amount of the projected reference bar to the axial portion of the object. That is, a user input may be determined based on the rotation variation amount of the projected reference bar, and the rotation of the end portion of the object may be controlled according to the determined user input. In some examples, a predetermined corresponding ratio may be applied to the rotation variation amount of the projected reference bar to determine the user input. For example, the corresponding ratio may be determined based on a distance between the two hands of the user. The descriptions provided above may apply thereto, and thus a detailed description will be omitted.

Figure 34:
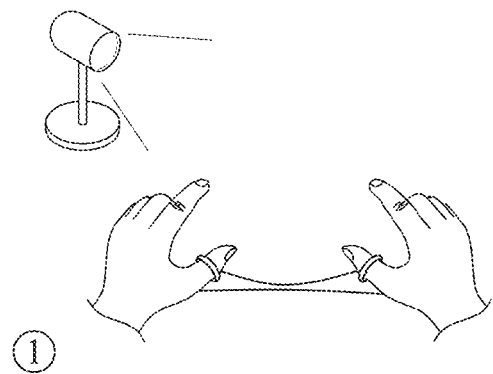
Figure 35:
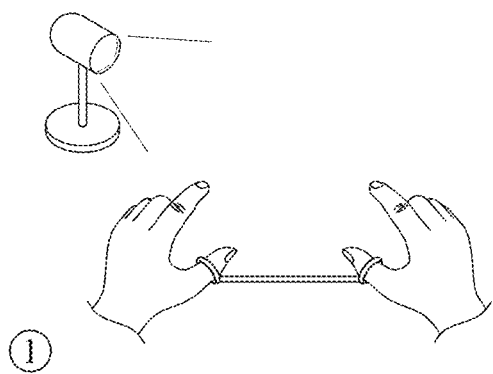

Referring to FIG. 34, an example in which two hands of a user are connected by a length-variable member is illustrated. Referring to FIG. 35, an example in which two hands of a user are connected by a length-fixed member is illustrated. The descriptions provided above may apply to the length-variable member and the length-fixed member, and thus a detailed description will be omitted.

Figure 36:
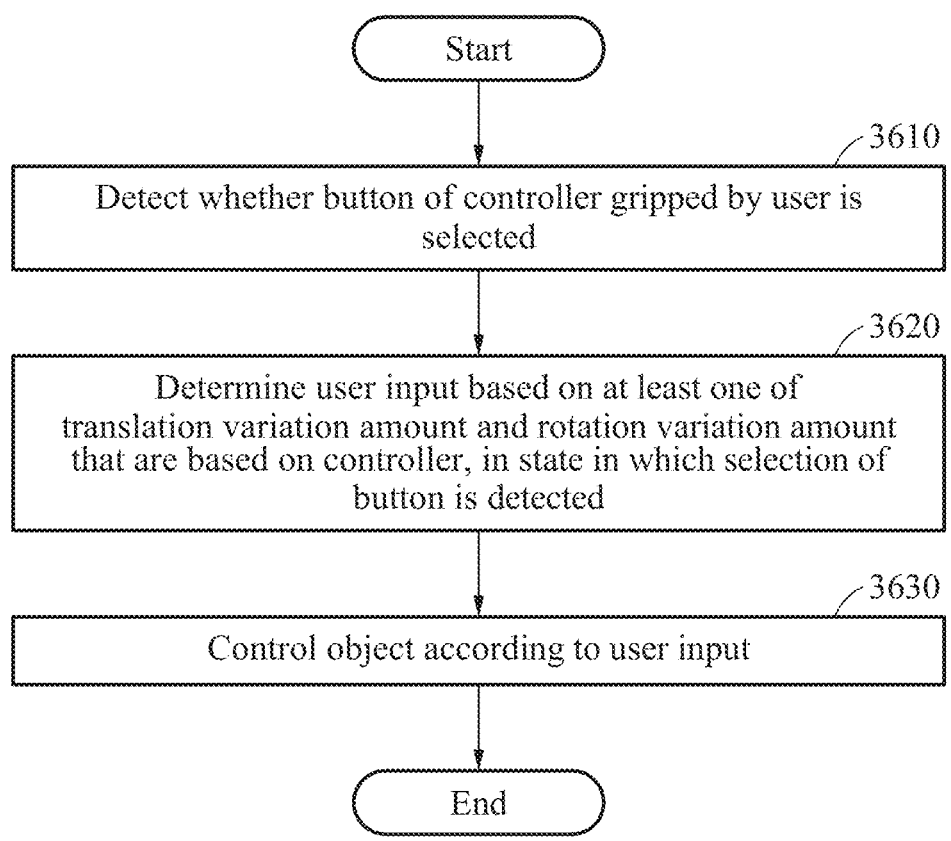
FIG. 36 illustrates an object control method according to an embodiment.

FIG. 36 illustrates an object control method according to an embodiment.

Referring to FIG. 36, an object control method performed by a processor of an object control device is illustrated.

In operation 3610, the object control device detects a control activation/deactivation command generated by a user. In operation 3620, the object control device detects a user instruction including a translation variation amount command and a rotation variation amount command, in a state in which the control activation/deactivation command is detected. In operation 3630, the object control device determines a user input according to the translation variation amount command and the rotation variation amount command. In operation 3640, the object control device controls an object according to the user input.

The description provided above may apply to the operations of FIG. 36, and thus a detailed description will be omitted.

Figure 37:
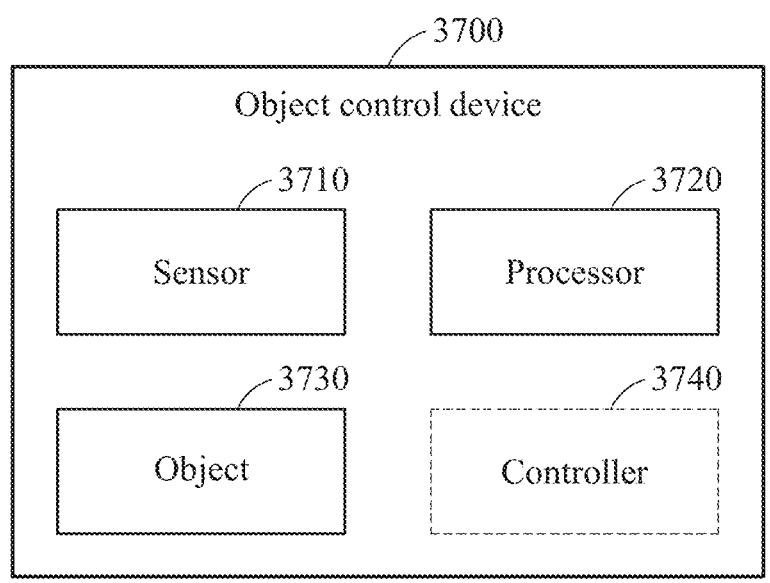
FIG. 37 illustrates an object control device according to an embodiment.

FIG. 37 illustrates an object control device according to an embodiment.

Referring to FIG. 37, an object control device 3700 includes a sensor 3710, a processor 3720, and an object 3730. The object control device 3700 may further include a controller 3740 in some examples. The sensor 3710, the processor 3720, the object 3730, and the controller 3740 included in the object control device 3700 may perform communication based on at least one of a wired network and a wireless network. Here, the sensor 3710 may also be referred to as a detection means. The controller 3740 may also be referred to as a user instruction transfer means. The object control device 3700 may process the operations described above, and thus a detailed description will be omitted.

The units described herein may be implemented using a hardware component, a software component and/or a combination thereof. A processing device may be implemented using one or more general-purpose or special-purpose computers, such as, for example, a processor, a controller and an arithmetic logic unit (ALU), a DSP, a microcomputer, an FPGA, a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, the processing device may include a plurality of processors, or a single processor and a single controller. In addition, different processing configurations are possible, such a parallel processors.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described examples may be recorded in non-transitory computer-readable media including program instructions to implement various operations of the above-described examples. The media may also include, alone or in combination with the program instructions, data files, data structures, and the like. The program instructions recorded on the media may be those specially designed and constructed for the purposes of examples, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter. The above-described devices may be configured to act as one or more software modules in order to perform the operations of the above-described examples, or vice versa.

The components described in the embodiments may be implemented by hardware components including, for example, at least one digital signal processor (DSP), a processor, a controller, an application-specific integrated circuit (ASIC), a programmable logic element, such as a field-programmable gate array (FPGA), other electronic devices, or combinations thereof. At least some of the functions or the processes described in the embodiments may be implemented by software, and the software may be recorded on a recording medium. The components, the functions, and the processes described in the embodiments may be implemented by a combination of hardware and software.

A number of embodiments have been described above. Nevertheless, it should be understood that various modifications may be made to these examples. For example, suitable results may be achieved if the described techniques are performed in a different order and/or if components in a described system, architecture, device, or circuit are combined in a different manner and/or replaced or supplemented by other components or their equivalents.

The invention claimed is:

1. An object control method, comprising
    detecting a control activation/deactivation command based on whether one or two hands of a user take a predetermined pose;
    setting a virtual reference geometry that is mapped to an object to be controlled by using a center point determined based on a three-dimensional position of the one or two hands of the user, in a state in which the control activation/deactivation command is detected, when the one or two hands of the user take the predetermined pose;
    determining at least one of a translation variation amount and a rotation variation amount of the virtual reference geometry that moves along the one or two hands of the user, when the one or two hands of the user are moved while taking the predetermined pose;
    determining at least one of a translation velocity and a rotation velocity of the center point when the one or two hands of the user are moved; and
    controlling the object based on the at least one of the translation variation amount and the rotation variation amount of the virtual reference geometry and the at least one of the translation velocity and the rotation velocity of the center point,
    wherein the virtual reference geometry is mapped to an end portion of the object to be controlled or projected perpendicularly to a plane perpendicular to an axis of the object to be controlled,
    wherein controlling the object further comprises adaptively determining a corresponding ratio based on a distance between the two hands of the user and the at least one of the translation velocity and the rotation velocity, and controlling the object by applying the corresponding ratio to the at least one of the translation variation amount and the rotation variation amount of the virtual reference geometry, and
    wherein controlling the object by applying the corresponding ratio comprises controlling at least one of the translation and rotation of the object to be more or less than the at least one of the translation variation amount and the rotation variation amount of the virtual reference geometry based on the corresponding ratio.

2. The object control method of claim 1, wherein the pre-determined pose is any one of a pose of contacting at least two fingers of the user against each other and a first pose of the user.

3. The object control method of claim 1, wherein the virtual reference geometry is a plane fixed to a contact point of two contacting fingers, among fingers of one hand of the user.

4. The object control method of claim 1, wherein the virtual reference geometry is a plane fixed to a contact point of contacting fingers of each hand, among fingers of the two hands of the user.

5. The object control method of claim 1, wherein the virtual reference geometry is a bar that is formed firstly based on one hand of the user, and formed secondly by being projected on a plane perpendicular to an axis of the object.

6. The object control method of claim 1, wherein the virtual reference geometry is a bar that is formed one-dimensionally based on a contact point of contacting fingers of each hand, among fingers of the two hands of the user, and formed two-dimensionally by being projected on a plane perpendicular to an axis of the object.

7. The object control method of claim 1, wherein the corresponding ratio is determined to be great when the distance between the two hands of the user is short.

8. An object control method, comprising:
    detecting a control activation/deactivation command based on an ON/OFF detection of a switch included in one or two controllers that are gripped by a user with one or two hands;
    setting a virtual reference geometry that is mapped to an object to be controlled by using a center point determined based on a three-dimensional position of the one or two controllers, in a state in which the control activation/deactivation command is detected, when ON of the switch included in the one or two controllers is detected;
    determining at least one of a translation variation amount and a rotation variation amount of the virtual reference geometry that moves along the one or two controllers, when the one or two controllers are moved when the ON of the switch is detected;
    determining at least one of a translation velocity and a rotation velocity of the center point when the one or two controllers are moved; and
    controlling the object based on the at least one of the translation variation amount and the rotation variation amount of the virtual reference geometry and the at least one of the translation velocity and the rotation velocity of the center point,
    wherein the virtual reference geometry is mapped to an end portion of the object to be controlled or projected perpendicularly to a plane perpendicular to an axis of the object to be controlled,
    wherein controlling the object further comprises adaptively determining a corresponding ratio based on a distance between the controllers gripped by the user with two hands and the at least one of the translation velocity and the rotation velocity, and controlling the object by applying the corresponding ratio to the at least one of the translation variation amount and the rotation variation amount of the virtual reference geometry, and
    wherein controlling the object by applying the corresponding ratio comprises controlling at least one of the translation and rotation of the object to be more or less than the at least one of the translation variation amount and the rotation variation amount of the virtual reference geometry based on the corresponding ratio.

9. The object control method of claim 8, wherein the virtual reference geometry is a plane fixed to a predetermined position of the controller gripped by the user with one hand.

10. The object control method of claim 8, wherein the virtual reference geometry is a plane fixed to predetermined positions of the controllers gripped by the user with two hands.

11. The object control method of claim 8, wherein the virtual reference geometry is a bar that is formed firstly in a length or width direction of the controller gripped by the user with one hand, and formed secondly by being projected on a plane perpendicular to an axis of the object.

12. The object control method of claim 8, wherein the virtual reference geometry is a bar that is formed firstly to penetrate through predetermined positions of the controllers gripped by the user with two hands, and formed secondly by being projected on a plane perpendicular to an axis of the object.

13. An object control device, comprising
a detection means configured to detect a control activation/deactivation command generated by a user and at least one of a translation variation amount and a rotation variation amount of a virtual reference geometry that is mapped to an object to be controlled; and
a processor configured to:
- recognize a user command by receiving a signal detected by the detection means, and apply a control signal corresponding to the recognized user command to an object;
- detect a control activation/deactivation command based on whether one or two hands of the user take a predetermined pose by using the detection means;
- set the virtual reference geometry that is mapped to the object to be controlled by using a center point determined based on a three-dimensional position of the one or two hands of the user, in a state in which the control activation/deactivation command is detected, when the one or two hands of the user take the predetermined pose;
- determine at least one of the translation variation amount and the rotation variation amount of the virtual reference geometry that moves along the one or two hands of the user, when the one or two hands of the user are moved while taking the predetermined pose;
- determine at least one of a translation velocity and a rotation velocity of the center point when the one or two hands of the user are moved; and
- control the object based on the at least one of the translation variation amount and the rotation variation amount of the virtual reference geometry and the at least one of the translation velocity and the rotation velocity of the center point, wherein the virtual reference geometry is mapped to an end portion of the object to be controlled or projected perpendicularly to a plane perpendicular to an axis of the object to be controlled, wherein the processor is further configured to control the object by adaptively determining a corresponding ratio based on a distance between the two hands of the user and the at least one of the translation velocity and the rotation velocity, and apply the corresponding ratio to the at least one of the translation variation amount and the rotation variation amount of the virtual reference geometry, and wherein the processor is further configured to control at least one of the translation and rotation of the object to be more or less than the at least one of the translation variation amount and the rotation variation amount of the virtual reference geometry based on the corresponding ratio.

* * * * *